(12) United States Patent
Choi et al.

(10) Patent No.: US 12,498,759 B2
(45) Date of Patent: Dec. 16, 2025

(54) DISPLAY DEVICE

(71) Applicant: Samsung Display Co., LTD., Yongin-si (KR)

(72) Inventors: Ji Woong Choi, Yongin-si (KR); Sungwon Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 186 days.

(21) Appl. No.: 18/452,597

(22) Filed: Aug. 21, 2023

(65) Prior Publication Data

US 2024/0176392 A1 May 30, 2024

(30) Foreign Application Priority Data

Nov. 29, 2022 (KR) ........................ 10-2022-0163060

(51) Int. Cl.
*G06F 1/16* (2006.01)

(52) U.S. Cl.
CPC .......... *G06F 1/1641* (2013.01); *G06F 1/1624* (2013.01); *G06F 1/1652* (2013.01)

(58) Field of Classification Search
CPC .... G06F 1/1641; G06F 1/1624; G06F 1/1652; G06F 1/16; G06F 1/1681; G09F 9/301; H10K 50/84; H10K 77/111; H10K 2102/311
See application file for complete search history.

(56) References Cited

U.S. PATENT DOCUMENTS

| | | | |
|---|---|---|---|
| 10,194,543 B2 | 1/2019 | Seo et al. | |
| 11,012,546 B1* | 5/2021 | Song | G06F 1/1656 |
| 11,058,018 B1 | 7/2021 | Yoon et al. | |
| 11,194,363 B2 | 12/2021 | Kim et al. | |
| 11,416,036 B2* | 8/2022 | Yin | G06F 1/1652 |
| 11,800,659 B2 | 10/2023 | Yoon | |
| 11,810,482 B2* | 11/2023 | Wu | G06F 1/1635 |
| 11,812,565 B2* | 11/2023 | Seki | H05K 5/0217 |
| 11,899,494 B2* | 2/2024 | Zhang | G06F 1/1624 |
| 12,164,333 B2* | 12/2024 | Wang | G06F 1/1641 |
| 12,167,549 B2* | 12/2024 | Wang | G06F 1/1624 |
| 2018/0348567 A1* | 12/2018 | Shin | H10D 86/0212 |
| 2021/0410305 A1* | 12/2021 | Feng | H04M 1/0216 |
| 2022/0006038 A1 | 1/2022 | Park et al. | |
| 2022/0068170 A1* | 3/2022 | Han | G06F 1/1652 |
| 2022/0150847 A1 | 5/2022 | Lee et al. | |

(Continued)

FOREIGN PATENT DOCUMENTS

| | | |
|---|---|---|
| CN | 209447443 U | 9/2019 |
| KR | 1020180040181 A | 4/2018 |

(Continued)

*Primary Examiner* — Rockshana D Chowdhury
(74) *Attorney, Agent, or Firm* — CANTOR COLBURN LLP

(57) ABSTRACT

A display device includes a display module, a support plate that is disposed on a rear surface of the display module and that includes a flat portion and a flexible portion that extends from the flat portion and that is foldable such that a portion is disposed under the flat portion, wherein the flexible portion is foldable about a folding axis extending in one direction, and a plurality of link bars that are disposed on both side surfaces of the flexible portion opposite to each other in the one direction and that protrude in the one direction.

23 Claims, 27 Drawing Sheets

(56) References Cited

U.S. PATENT DOCUMENTS

| | | | |
|---|---|---|---|
| 2022/0166861 A1* | 5/2022 | Lim | G06F 1/1681 |
| 2022/0253103 A1* | 8/2022 | Choi | G06F 1/1624 |
| 2022/0255023 A1* | 8/2022 | Cai | B32B 3/14 |
| 2022/0272852 A1 | 8/2022 | Park et al. | |
| 2022/0340787 A1* | 10/2022 | Gu | C09J 5/00 |
| 2023/0098597 A1* | 3/2023 | Gao | H05K 5/0217 |
| | | | 361/807 |
| 2023/0393623 A1* | 12/2023 | Wang | G06F 1/1618 |

FOREIGN PATENT DOCUMENTS

| | | |
|---|---|---|
| KR | 20210031348 A | 3/2021 |
| KR | 20220003892 A | 1/2022 |
| KR | 20220037410 A | 3/2022 |
| KR | 102389189 B1 | 4/2022 |
| KR | 20220048423 A | 4/2022 |
| KR | 20220061806 A | 5/2022 |
| KR | 1020220059051 A | 5/2022 |
| KR | 1020220061823 A | 5/2022 |
| KR | 20220079400 A | 6/2022 |
| KR | 1020220077685 A | 6/2022 |

\* cited by examiner

FIG. 5
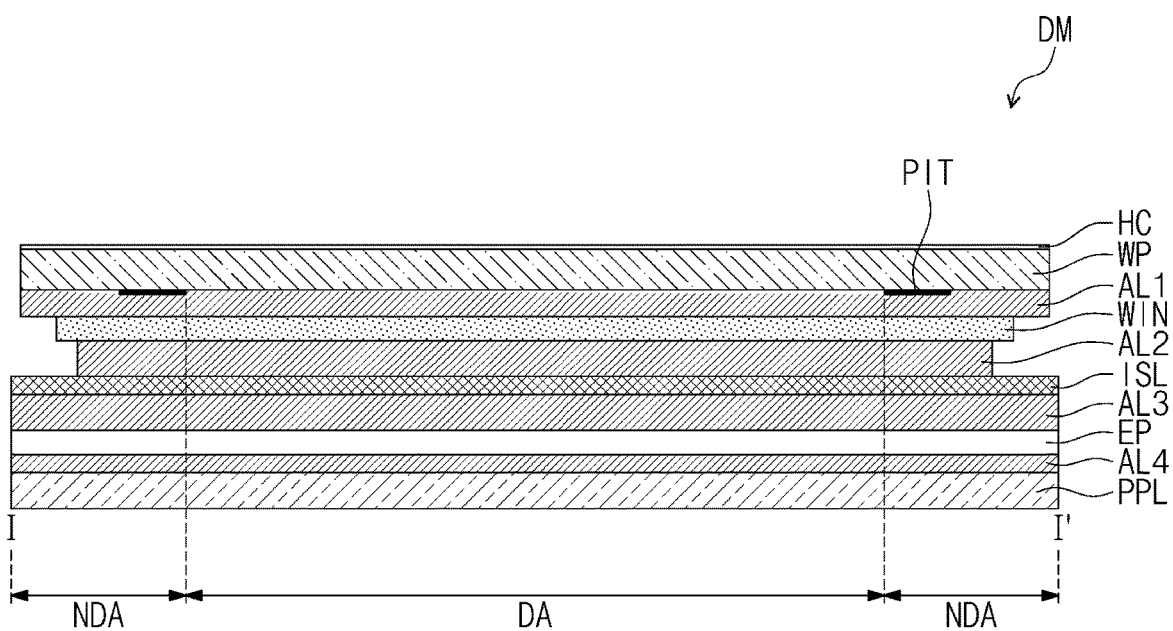
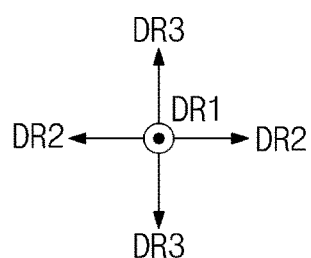
FIG. 6
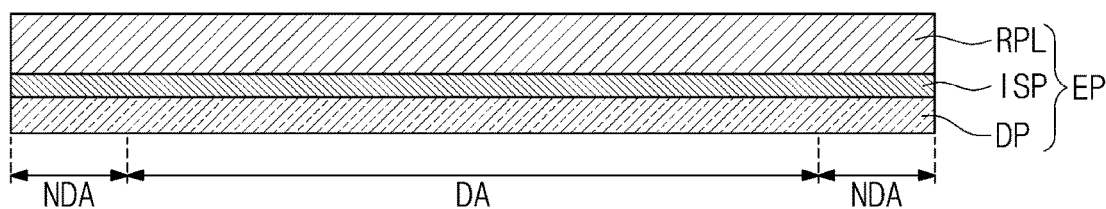
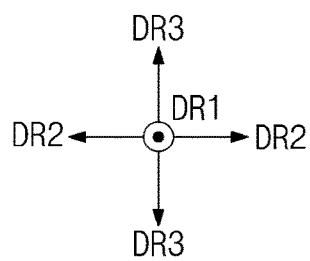

FIG. 7
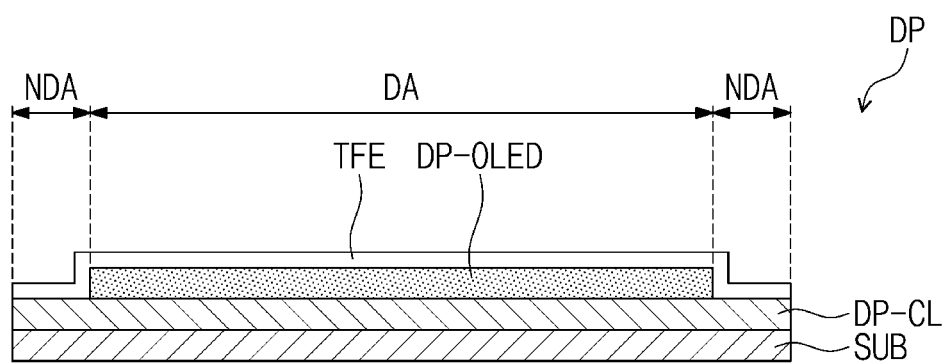
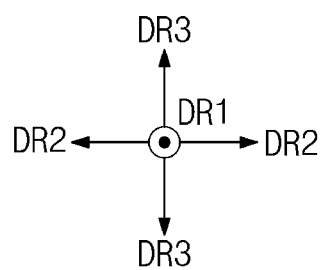

FIG. 8
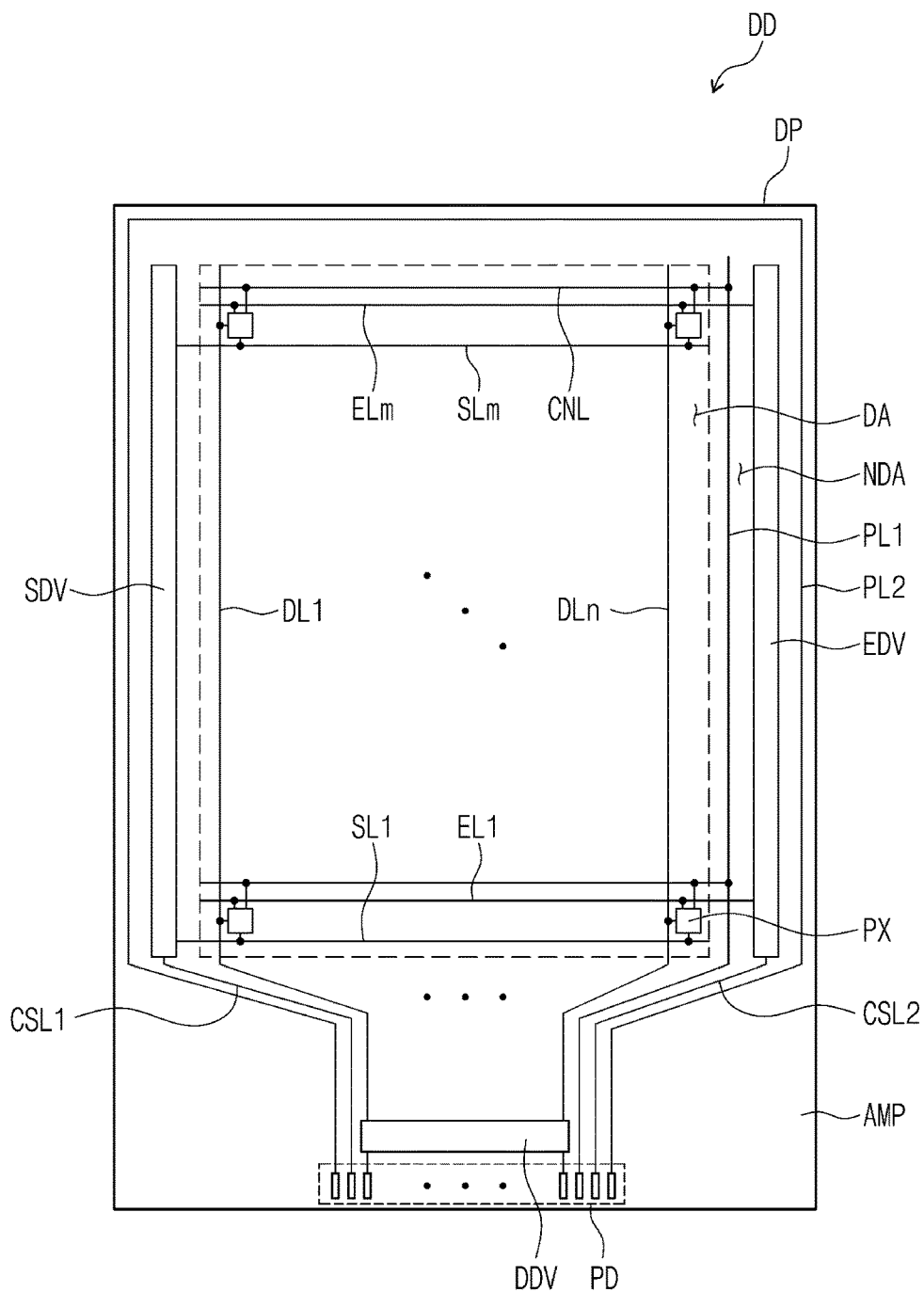
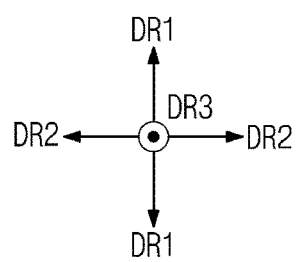

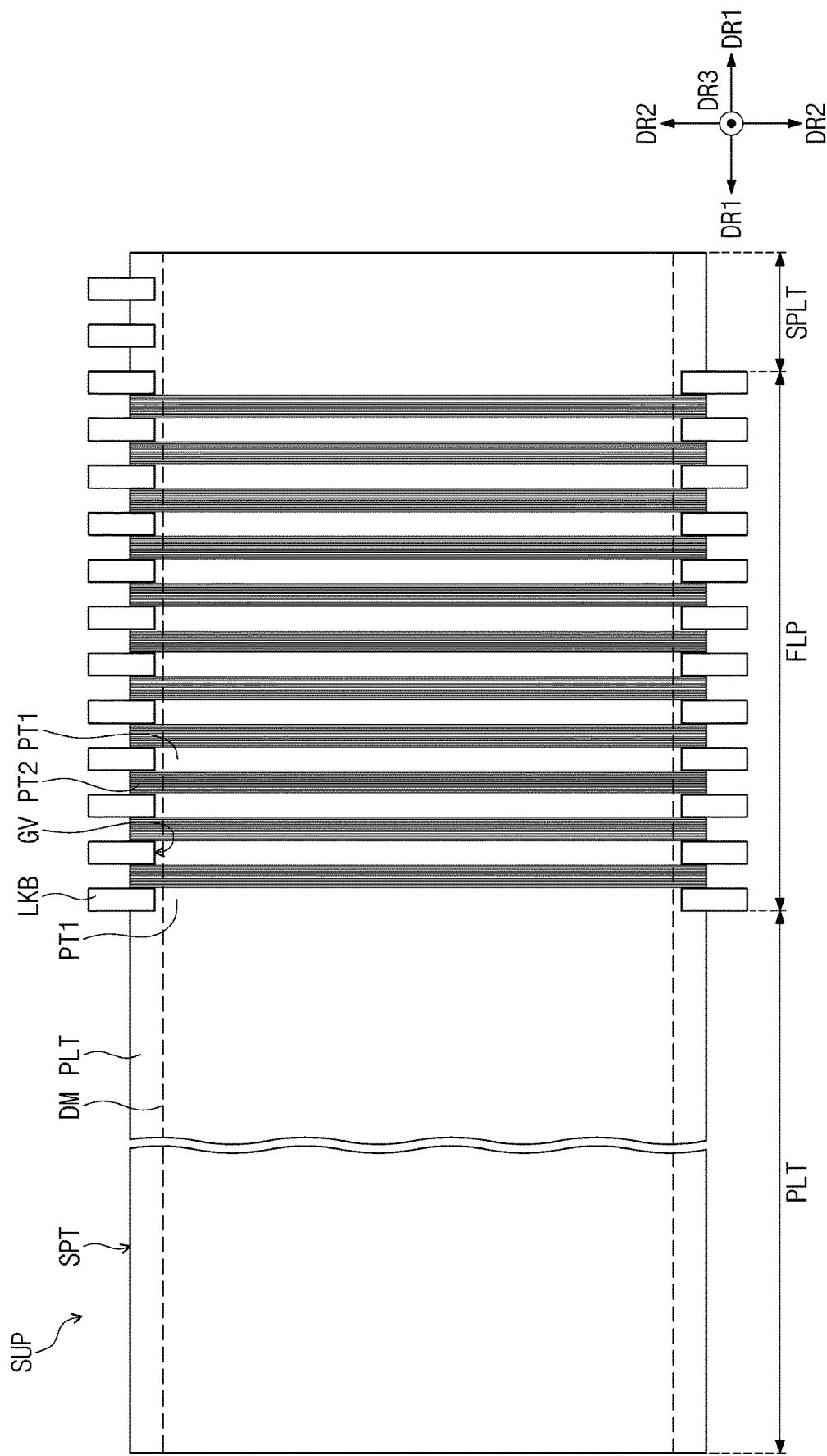

FIG. 20A
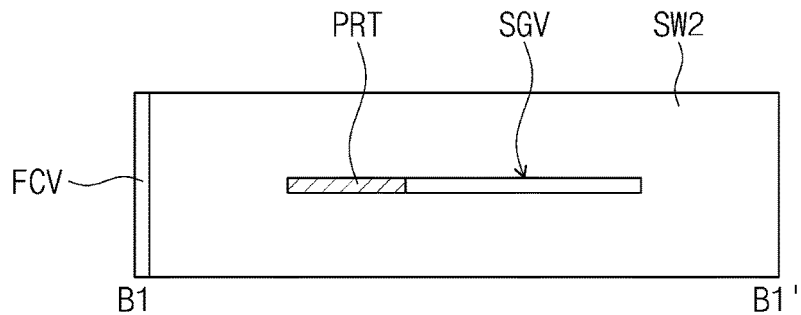
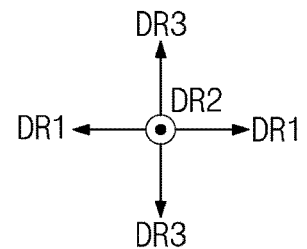
FIG. 20B
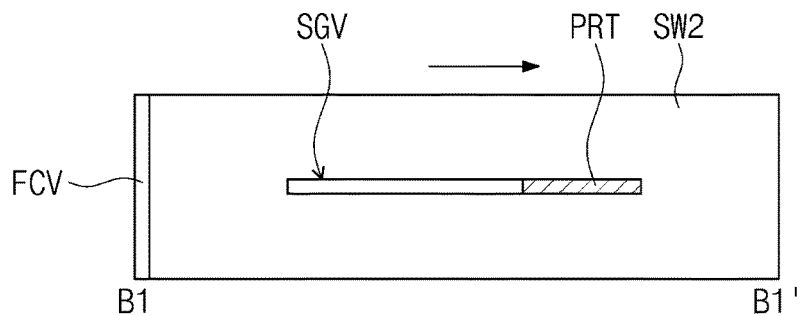
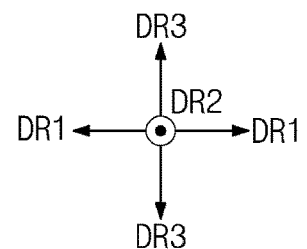

DISPLAY DEVICE

This application claims priority to Korean Patent Application No. 10-2022-0163060, filed on Nov. 29, 2022, and all of the benefits accruing therefrom under 35 U.S.C. § 119, the content of which in its entirety is incorporated herein by reference.

BACKGROUND

1. Field

Embodiments of the disclosure described herein relate to a display device.

2. Description of the Related Art

In general, an electronic device, such as a smart phone, a digital camera, a notebook computer, a car navigation device, a smart television, or the like, which provides an image to a user includes a display device for displaying an image. The display device generates an image and provides the generated image to the user through a display screen.

With the development of display device technology, various forms of display devices are being developed. For example, a flexible display device that can be slid or wound to extend outside a case is being developed. The flexible display device that can be deformed in various ways may be easy to carry and may improve user convenience.

SUMMARY

Embodiments of the disclosure provide a display device which includes a support plate that is easily folded together with a display module and that is lighter in weight.

According to an embodiment, a display device includes a display module, a support plate that is disposed on a rear surface of the display module and that includes a flat portion and a flexible portion that extends from the flat portion and that is foldable such that a portion may be disposed under the flat portion, wherein the flexible portion is foldable about a folding axis extending in one direction, and a plurality of link bars that are disposed on both side surfaces of the flexible portion opposite to each other in the one direction and that protrude in the one direction.

According to an embodiment, a display device includes a display module and a support plate that is disposed on a rear surface of the display module and that includes a flat portion and a flexible portion that extends from the flat portion and that is foldable such that a portion is disposed under the flat portion, the flexible portion having a lower elastic modulus than the flat portion. The flexible portion is foldable about a folding axis extending in one direction. The flexible portion includes a plurality of first portions and a plurality of second portions disposed between the plurality of first portions. The plurality of second portions extend in a zigzag pattern in a first direction crossing the one direction.

According to an embodiment, a display device includes a display module, a support plate that is disposed on a rear surface of the display module and that extends in a first direction, a plurality of link bars disposed on both side surfaces of the support plate opposite to each other in a second direction crossing the first direction, a case that accommodates the display module and the support plate, and guide rails disposed on inner surfaces of the case that face each other in the second direction, wherein the guide rails are disposed in insertion grooves defined at the ends of the plurality of link bars.

BRIEF DESCRIPTION OF THE DRAWINGS

The above and other features of embodiments of the disclosure will become apparent by describing in detail embodiments thereof with reference to the accompanying drawings.

FIG. 5 is a sectional view of the display module in FIG. 3 taken along line I-I' illustrated in FIG. 3.

FIG. 6 is a sectional view illustrating a configuration of an electronic panel illustrated in FIG. 5 according to an embodiment of the disclosure.

FIG. 7 is a sectional view illustrating a configuration of a display panel illustrated in FIG. 6 according to an embodiment of the disclosure.

FIG. 8 is a plan view of the display panel illustrated in FIG. 7 according to an embodiment of the disclosure.

FIG. 10 is a plan view illustrating a support part accommodated in the first and second cases illustrated in FIG. 9 according to an embodiment of the disclosure.

FIG. 20A is a sectional view of the case illustrated in FIG. 1 taken along line B1-B1' illustrated in FIG. 9.

FIG. 20B is a sectional view of the case in FIG. 1 taken along line B1-B1' illustrated in FIG. 9.

DETAILED DESCRIPTION

Figure 1:
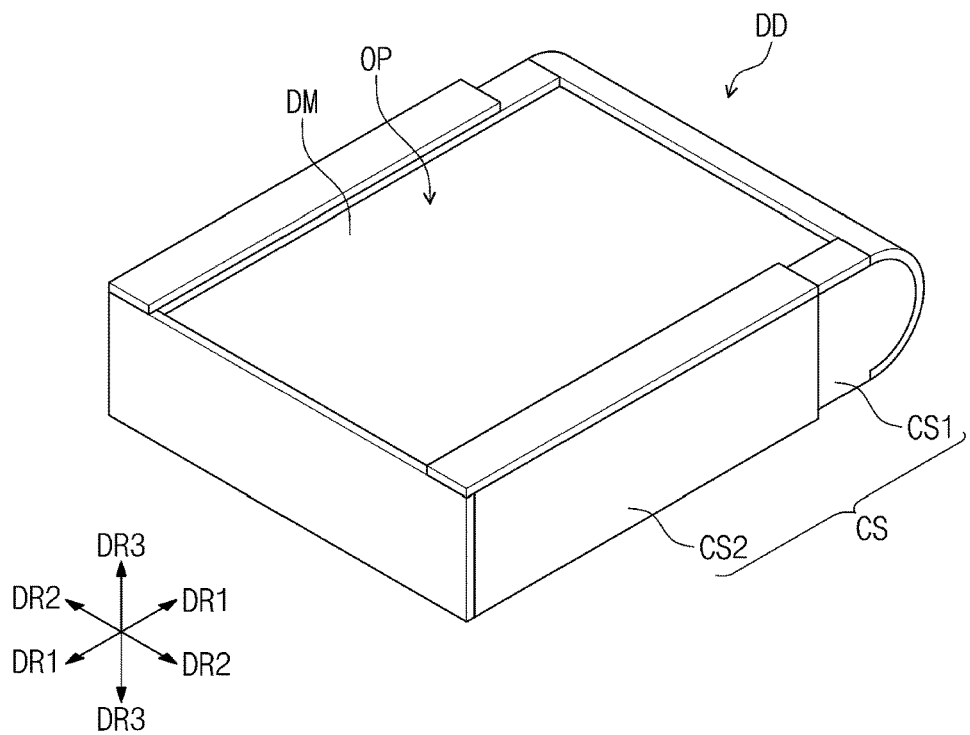
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The flexible display device may include a flexible display module. The display module may be accommodated in the case and may be extended by being withdrawn from the case to the outside as needed. A support part for supporting the display module may be disposed under the display module.

In the specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components may be exaggerated for effective description.

Terms such as first, second, and the like may be used to describe various components, but the components should not be limited by the terms. The terms may be used only for distinguishing one component from other components. For example, without departing the scope of the disclosure, a first component may be referred to as a second component, and similarly, the second component may also be referred to as the first component. The terms of a singular form may include plural forms unless otherwise specified.

The terminology used herein is for the purpose of describing particular embodiments only and is not intended to be limiting. As used herein, "a", "an," "the," and "at least one" do not denote a limitation of quantity and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In addition, terms such as "below", "under", "above", and "over" are used to describe a relationship of components illustrated in the drawings. The terms are relative concepts and are described based on directions illustrated in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein, including technical or scientific terms, have the same meanings as those generally understood by those skilled in the art to which the disclosure pertains. Such terms as those defined in a generally used dictionary are to be interpreted as having meanings consistent with the contextual meanings in the relevant field of art, and should not be interpreted as having ideal or formal meanings unless explicitly defined as having such in the application.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the disclosure will be described with reference to the accompanying drawings.

Figure 2:
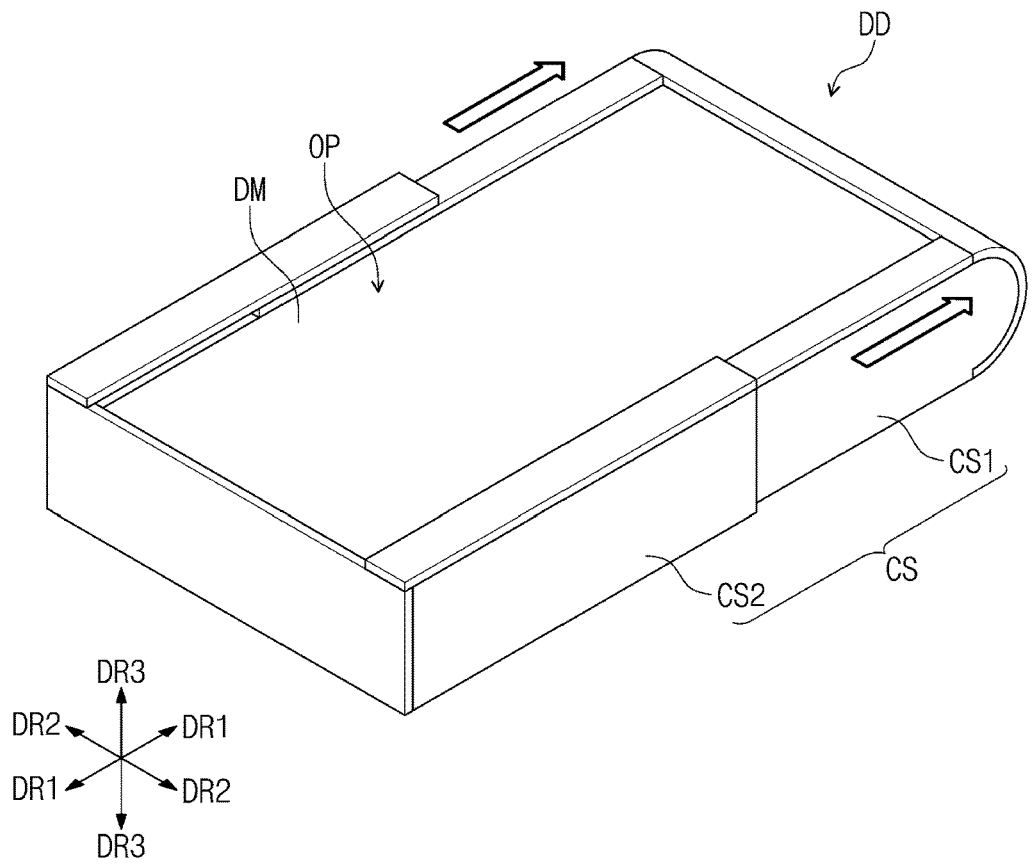
FIG. 2 is a perspective view of the display device illustrated in FIG. 1 in an extended mode according to an embodiment of the disclosure.

FIG. 1 is a perspective view of a display device according to an embodiment of the disclosure. FIG. 2 is a view for describing an extended mode of the display device illustrated in FIG. 1.

Referring to FIG. 1, the display device DD according to an embodiment of the disclosure may include a display module DM and a case CS in which the display module DM may be accommodated. The display module DM may be exposed to the outside through an opening OP defined in an upper portion of the case CS.

The case CS may include a first case CS1 and a second case CS2 coupled with each other to accommodate the display module DM. The first case CS1 may be coupled with the second case CS2 to move in a first direction DR1.

Hereinafter, a direction crossing the first direction DR1 is defined as a second direction DR2. A direction substantially vertically crossing a plane defined by the first and second directions DR1 and DR2, respectively, is defined as a third direction DR3. As used herein, the expression "when viewed on the plane" may mean that it is viewed in the third direction DR3.

More detailed configurations of the first and second cases CS1 and CS2, respectively, will be described below in detail with reference to an exploded perspective view of the case CS illustrated in FIG. 9.

Referring to FIGS. 1 and 2, in an embodiment, the first case CS1 may move toward or away from the second case CS2 in the first direction DR1. When the first case CS1 moves in the first direction DR1, the area of an exposed surface of the display module DM may be adjusted depending on the movement of the first case CS1. Both a default mode and the extended mode of the display device DD may be implemented depending on the movement of the first case CS1.

The display module DM may be a flexible display module and may be supported by a support part (specifically illustrated in FIG. 10) disposed under the display module DM. The display module DM and the support part may be accommodated in the first and second cases CS1 and CS2, respectively. The display module DM and the support part may be connected to the second case CS2, and when the first case CS1 moves away from the second case CS2 in the first direction DR1, the display module DM and the support part may also move in the first direction DR1.

Although not illustrated, in addition to a portion of the display module DM exposed through the opening OP, a portion of the display module DM not exposed to the outside may be disposed in the first case CS1.

Referring to FIG. 2, the first case CS1 may move away from the second case CS2 in the first direction DR1. In an embodiment, the display module DM disposed on the support part may move together with the support part in the first direction DR1 depending on the movement of the first case CS1, and thus the exposed surface of the display module DM may be extended. As the exposed surface of the display module DM is extended, a user may visually recognize an image through a larger screen. The state of the display device DD in which the exposed surface of the display module DM is extended may be defined as the extended mode.

Referring to FIG. 1, the first case CS1 may toward the second case CS2 in the first direction DR1. When the first case CS1 moves toward the second case CS2 to the maximum, the exposed surface of the display module DM may be set to a minimum. The state of the display device DD may be defined as the default mode.

Figure 3:
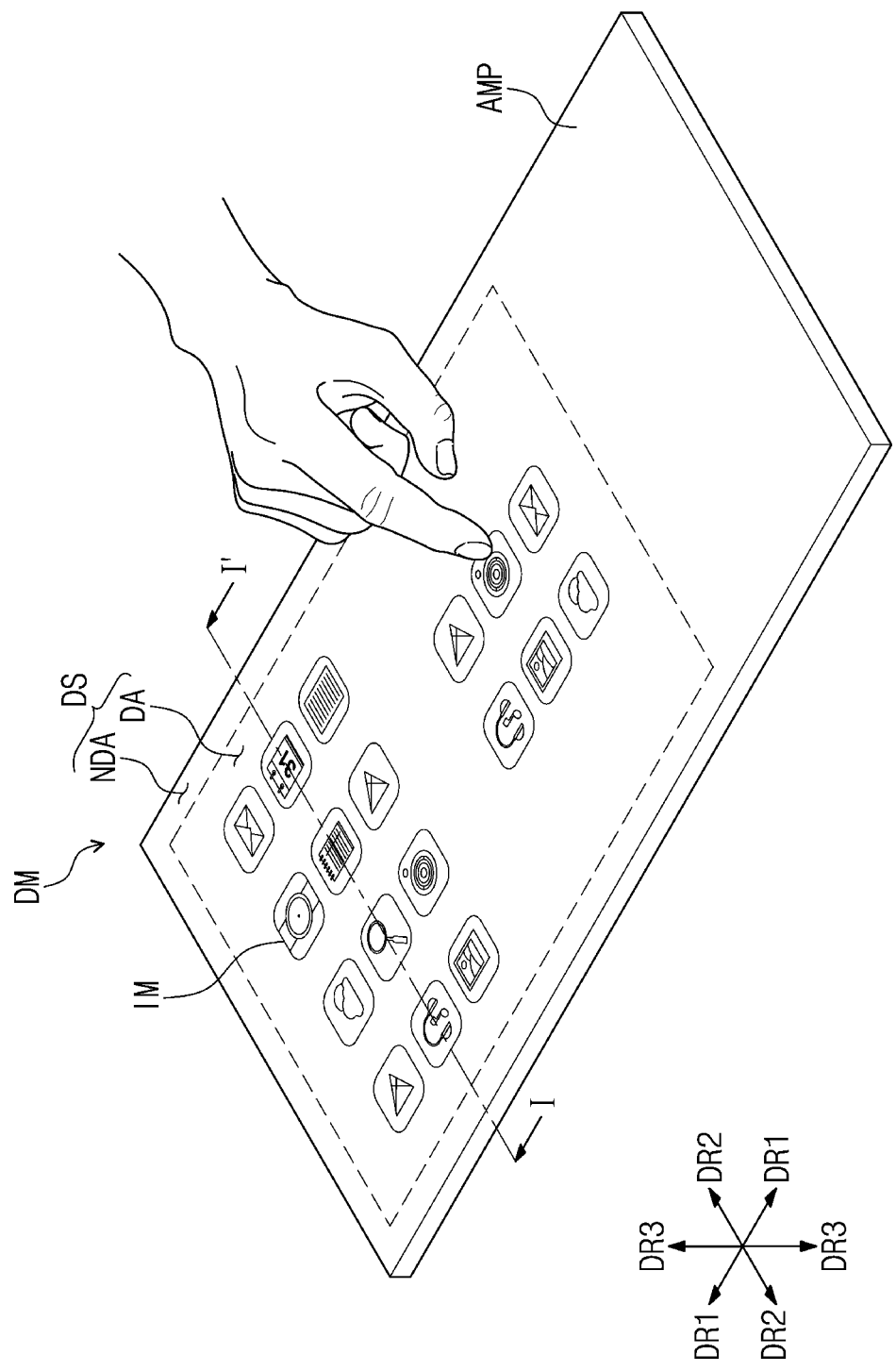
FIG. 3 is a plan view of a display module that is foldable for accommodation within a case illustrated in FIG. 1 according to an embodiment of the disclosure.
Figure 4:
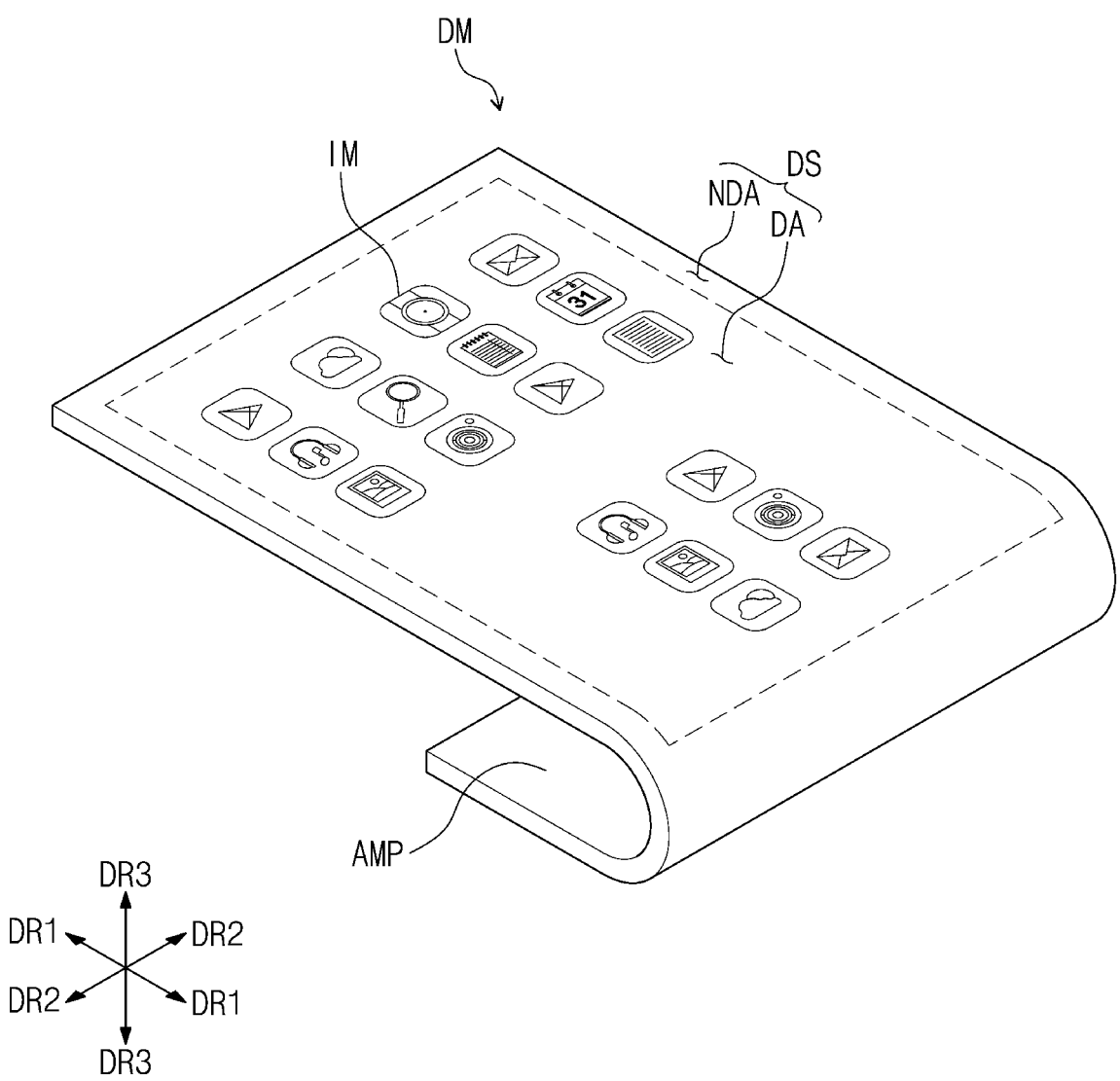
FIG. 4 is a plan view illustrating a folded state of the display module illustrated in FIG. 3 according to an embodiment of the disclosure.

FIG. 3 is a plan view of the display module accommodated in the case illustrated in FIG. 1, in an embodiment. FIG. 4 is a view illustrating a folded state of the display module illustrated in FIG. 3, in an embodiment.

Referring to FIG. 3, the display module DM may have a rectangular shape with long sides extending in the first direction DR1 and short sides extending in the second direction DR2. However, without being limited thereto, the display module DM may have various shapes such as a circular shape, a polygonal shape, a square shape and the like.

An upper surface of the display module DM may be defined as a display surface DS and may have a plane defined by the first direction DR1 and the second direction DR2. Images IM generated by the display module DM may be provided to the user through the display surface DS.

The display surface DS may include a display region DA and a non-display region NDA around the display region DA. The display region DA may display an image, and the non-display region NDA may not display an image. In an embodiment, the non-display region NDA may surround the display region DA and may define a border of the display module DM printed in a predetermined color.

The display module DM may sense an input applied from outside the display module DM. For example, in an embodiment, the display module DM may sense a touch of the user as an external input and may display an image corresponding to a sensed signal.

The display module DM may include an accommodated portion AMP adjacent to the display region DA. The accommodated portion AMP may be adjacent to one side of the display module DM in the first direction DR1. The accommodated portion AMP may be substantially the non-display region NDA. The accommodated portion AMP may be defined as the non-display region NDA adjacent to the one side of the display module DM.

The accommodated portion AMP may have a larger area than the non-display regions NDA adjacent to both sides of the display module DM opposite to each other in the second direction DR2 and the non-display region NDA adjacent to an opposite side of the display module DM in the first direction DR1.

Referring to FIGS. 1 and 4, the display module DM may be a flexible display module. The display module DM may be foldable to be accommodated in the case CS. The display region DA of the display module DM may be exposed to the outside. The area of the display region DA exposed to the outside may be adjusted depending on the movement of the first and second cases CS1 and CS2, respectively.

In an embodiment, when the display module DM is folded, the accommodated portion AMP may be disposed under the display region DA. The accommodated portion AMP may be accommodated in the case CS and may not be exposed to the outside. A driver for driving elements of the display module DM may be disposed on the accommodated portion AMP.

FIG. 5 is a sectional view taken along line I-I' illustrated in FIG. 3, in an embodiment.

Referring to FIG. 5, the display module DM may include an electronic panel EP, an impact absorbing layer ISL, a panel protection layer PPL, a window WIN, a window protection layer WP, a hard coating layer HC, and first to fourth adhesive layers AL1 to AL4, respectively.

The electronic panel EP may display an image. The electronic panel EP may include a display panel, an input sensing part, and an anti-reflection layer, and the configuration of the electronic panel EP will be described below with reference to FIG. 6.

The impact absorbing layer ISL may be disposed on the electronic panel EP. The impact absorbing layer ISL may protect the electronic panel EP by absorbing an external impact applied toward the electronic panel EP from above the display device DD. In an embodiment, the impact absorbing layer ISL may be manufactured in the form of a stretchable film.

The impact absorbing layer ISL may include a flexible plastic material. The flexible plastic material may be defined as a synthetic resin film. For example, in an embodiment, the impact absorbing layer ISL may include a flexible plastic material such as polyimide (PI) and/or polyethylene terephthalate (PET).

The window WIN may be disposed on the impact absorbing layer ISL. The window WIN may protect the electronic panel EP from external scratches. The window WIN may have a property of being optically clear. The window WIN may include glass. However, without being limited thereto, the window WIN may include a synthetic resin film and the like.

The window WIN may have a multi-layer structure or a single-layer structure. For example, in an embodiment, the window WIN may include a plurality of synthetic resin films coupled by an adhesive, or may include a glass substrate and a synthetic resin film coupled by an adhesive.

The window protection layer WP may be disposed on the window WIN. The window protection layer WP may include a flexible plastic material such as polyimide or polyethylene terephthalate. The hard coating layer HC may be disposed on an upper surface of the window protection layer WP.

A printed layer PIT may be disposed on a lower surface of the window protection layer WP. The printed layer PIT may be black in color, but the color of the printed layer PIT is not limited thereto. In an embodiment, the printed layer PIT may be adjacent to the periphery of the window protection layer WP and/or may overlap the non-display region NDA.

The panel protection layer PPL may be disposed under the electronic panel EP. The panel protection layer PPL may protect a lower portion of the electronic panel EP. The panel protection layer PPL may include a flexible plastic material. For example, in an embodiment, the panel protection layer PPL may include polyimide and/or polyethylene terephthalate.

The first adhesive layer AL1 may be disposed between the window protection layer WP and the window WIN. The window protection layer WP and the window WIN may be bonded to each other by the first adhesive layer AL1. The first adhesive layer AL1 may cover the printed layer PIT.

The second adhesive layer AL2 may be disposed between the window WIN and the impact absorbing layer ISL. The window WIN and the impact absorbing layer ISL may be bonded to each other by the second adhesive layer AL2.

The third adhesive layer AL3 may be disposed between the impact absorbing layer ISL and the electronic panel EP. The impact absorbing layer ISL and the electronic panel EP may be bonded to each other by the third adhesive layer AL3.

The fourth adhesive layer AL4 may be disposed between the electronic panel EP and the panel protection layer PPL.

The electronic panel EP and the panel protection layer PPL may be bonded to each other by the fourth adhesive layer AL4.

The first to fourth adhesive layers AL1 to AL4, respectively, may include a pressure sensitive adhesive (PSA) and/or an optically clear adhesive (OCA). However, the type of adhesive is not limited thereto.

FIG. 6 is a sectional view illustrating a configuration of the electronic panel illustrated in FIG. 5 in an embodiment.

In FIG. 6, a section of the electronic panel EP viewed in the first direction DR1 is illustrated.

Referring to FIG. 6, the electronic panel EP may include the display panel DP, the input sensing part ISP disposed on the display panel DP, and the anti-reflection layer RPL disposed on the input sensing part ISP. The display panel DP may be a flexible display panel. For example, in an embodiment, the display panel DP may include a flexible substrate and a plurality of elements disposed on the flexible substrate.

The display panel DP according to an embodiment of the disclosure may be an emissive display panel but is not limited thereto. For example, the display panel DP may be an organic light emitting display panel or an inorganic light emitting display panel. An emissive layer of the organic light emitting display panel may include an organic light emitting material. An emissive layer of the inorganic light emitting display panel may include quantum dots, quantum rods, and the like. Hereinafter, it will be exemplified that the display panel DP may be an organic light emitting display panel.

The input sensing part ISP may include a plurality of sensors (not illustrated) for sensing an external input. For example, in an embodiment, the input sensing part ISP may sense an external input in a capacitive manner. However, a sensing method of the input sensing part ISP is not limited thereto. The input sensing part ISP may be directly formed on the display panel DP when the electronic panel EP is manufactured.

The anti-reflection layer RPL may be disposed on the input sensing part ISP. The anti-reflection layer RPL may be directly formed on the input sensing part ISP when the electronic panel EP is manufactured. In an embodiment, the anti-reflection layer RPL may be defined as a film for preventing reflection of external light. The anti-reflection layer RPL may decrease the reflectance of external light incident toward the display panel DP from above the display device DD.

When external light travelling toward the display panel DP is reflected from the display panel DP back to the user, the user may visually recognize the external light as in a mirror. To prevent such a phenomenon, the anti-reflection layer RPL may include a plurality of color filters that display the same colors as those of pixels of the display panel DP.

The color filters may filter the external light into the same colors as those of the pixels. In this case, the external light may not be visible to the user. However, without being limited thereto, the anti-reflection layer RPL may include a phase retarder and/or a polarizer to decrease the reflectance of the external light.

For example, in an embodiment, the input sensing part ISP may be directly formed on the display panel DP, and the anti-reflection layer RPL may be directly formed on the input sensing part ISP. However, embodiments of the disclosure are not limited thereto. For example, the input sensing part ISP may be separately manufactured and may be attached to the display panel DP by an adhesive layer, and/or the anti-reflection layer RPL may be separately manufactured and may be attached to the input sensing part ISP by an adhesive layer.

FIG. 7 is a sectional view illustrating an embodiment of the display panel illustrated in FIG. 6.

In FIG. 7, a section of the display panel DP viewed in the first direction DR1 is illustrated.

Referring to FIG. 7, an embodiment of the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display region DA and a non-display region NDA around the display region DA. In an embodiment, the substrate SUB may include a flexible plastic material such as polyimide. The display element layer DP-OLED may be disposed on the display region DA.

A plurality of pixels may be disposed on the display region DA. Each of the pixels may include a light emitting element that may be connected to a transistor disposed in the circuit element layer DP-CL and may be disposed in the display element layer DP-OLED.

The thin film encapsulation layer TFE may be disposed on the circuit element layer DP-CL to cover the display element layer DP-OLED. The thin film encapsulation layer TFE may include inorganic layers and/or an organic layer between the inorganic layers. The inorganic layers may protect the pixels from moisture/oxygen. The organic layer may protect the pixels from foreign matter such as dust particles.

FIG. 8 is a plan view of the display panel illustrated in FIG. 7.

Referring to FIG. 8, an embodiment of the display device DD may include the display panel DP, a scan driver SDV, a data driver DDV, a light emission driver EDV, and a plurality of pads PD.

In an embodiment, the display panel DP may have a rectangular shape with long sides extending in the first direction DR1 and short sides extending in the second direction DR2. However, the shape of the display panel DP is not limited thereto. The display panel DP may include a display region DA and a non-display region NDA surrounding the display region DA.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, respectively, first and second power lines PL1 and PL2, respectively, and connecting lines CNL, where "m" and "n" are natural numbers.

The pixels PX may be disposed in the display region DA. The scan driver SDV and the light emission driver EDV may be disposed in the non-display regions NDA adjacent to the long sides of the display panel DP, respectively. The data driver DDV may be disposed in the non-display region NDA adjacent to one of the short sides of the display panel DP. When viewed on the plane, the data driver DDV may be adjacent to a lower end of the display panel DP.

In FIG. 8, an embodiment of the accommodated portion AMP may be defined as the non-display region NDA adjacent to the lower end of the display panel DP. The data driver DDV may be disposed on the accommodated portion AMP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines EL1 to ELm may extend in the second direction DR2 and may be connected to the pixels PX and the light emission driver EDV.

The first power line PL1 may extend in the first direction DR1 and may be disposed in the non-display region NDA. The first power line PL1 may be disposed between the display region DA and the light emission driver EDV.

The connecting lines CNL may extend in the second direction DR2 and may be arranged in the first direction DR1 and connected to the first power line PL1 and the pixels PX. A first voltage may be applied to the pixels PX through the first power line PL1 and the connecting lines CNL connected with each other.

The second power line PL2 may be disposed in the non-display region NDA and may extend along the long sides of the display panel DP and the other short side of the display panel DP where the data driver DDV is not disposed. The second power line PL2 may be disposed outward of the scan driver SDV and the light emission driver EDV.

Although not illustrated, the second power line PL2 may extend toward the display region DA and may be connected to the pixels PX. A second voltage having a lower level than the first voltage may be applied to the pixels PX through the second power line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The pads PD may be disposed in the non-display region NDA adjacent to the lower end of the display panel DP and may be located closer to the lower end of the display panel DP than the data driver DDV. The data driver DDV, the first power line PL1, the second power line PL2, the first control line CSL1, and the second control line CSL2 may be connected to the pads PD. The data lines DL1 to DLn may be connected to the data driver DDV, and the data driver DDV may be connected to the pads PD corresponding to the data lines DL1 to DLn.

Although not illustrated, in an embodiment, the display device DD may further include a timing controller for controlling operations of the scan driver SDV, the data driver DDV, and the light emission driver EDV and/or a voltage generator for generating the first and second voltages. The timing controller and the voltage generator may be connected to the pads PD through a printed circuit board.

In an embodiment, the scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines EL1 to ELm.

In an embodiment, the pixels PX may receive the data voltages in response to the scan signals and may display an image by emitting light having luminance corresponding to the data voltages in response to the light emission signals.

Figure 9:
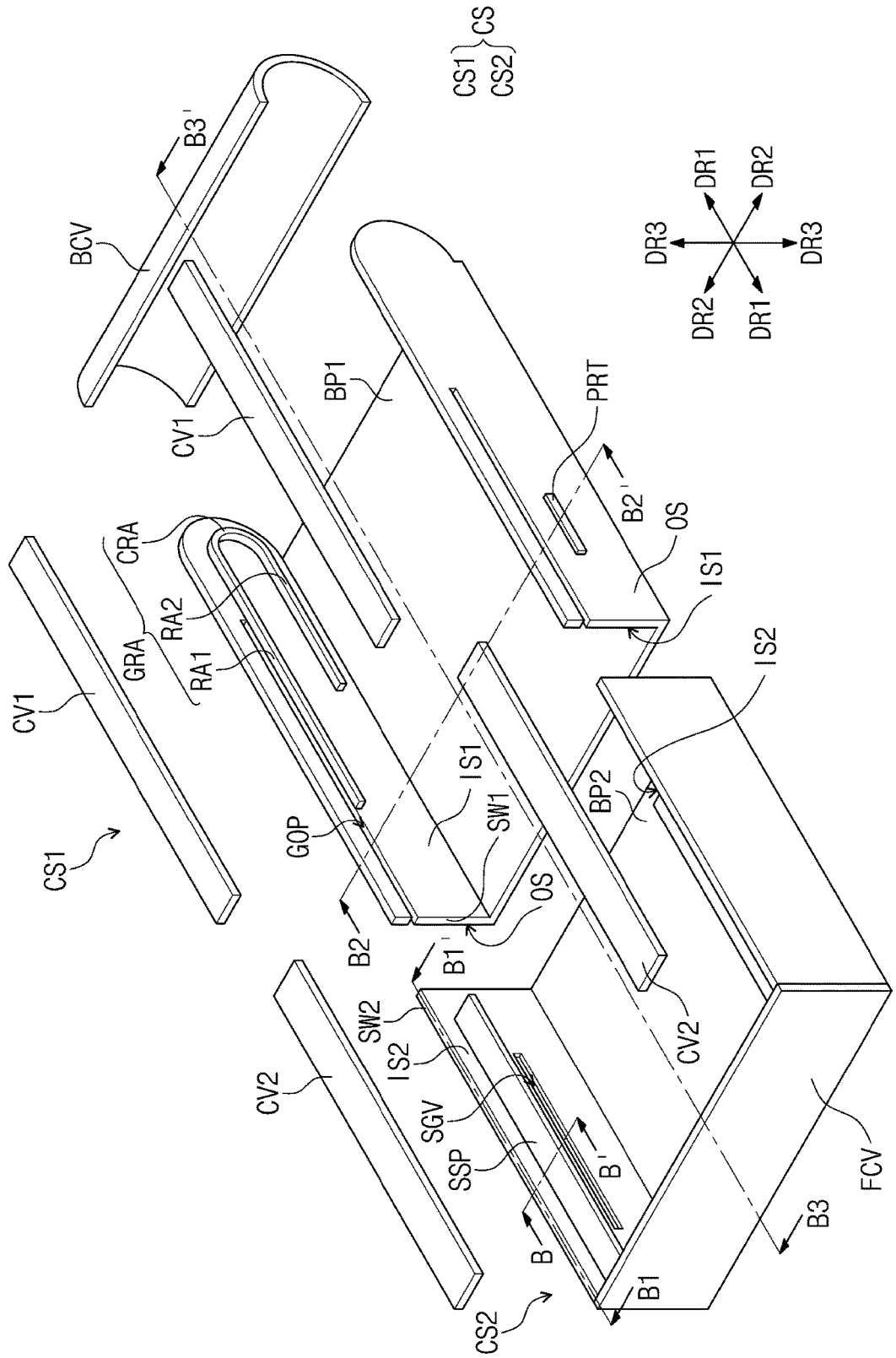
FIG. 9 is an exploded perspective view of the case illustrated in FIG. 1 according to an embodiment of the disclosure.

FIG. 9 is an exploded perspective view of the case illustrated in FIG. 1.

Referring to FIG. 9, an embodiment of the case CS may include the first case CS1 and the second case CS2 that are disposed in the first direction DR1. The first case CS1 and the second case CS2 may be coupled with each other in the first direction DR1.

The first case CS1 may include a first bottom part BP1, a plurality of first sidewalls SW1, a plurality of first covers CV1, a rear part BCV, a plurality of protrusions PRT, and a plurality of guide rails GRA.

The first bottom part BP1 may have a plane defined by the first and second directions DR1 and DR2. The first sidewalls SW1 may extend upward (e.g., in an upper direction based on the third direction DR3) from both sides of the first bottom part BP1 opposite to each other in the second direction DR2. The first sidewalls SW1 may have a plane defined by the first and third directions DR1 and DR3. The first sidewalls SW1 may extend longer in the first direction DR1 than in the third direction DR3.

In an embodiment, one side of each of the first sidewalls SW1 in the first direction DR1 may have a convex curved shape toward the outside. An opposite side of the first sidewall SW1 in the first direction DR1 may have a straight-line shape extending in the third direction DR3.

The first covers CV1 may be disposed on the first sidewalls SW1. The first covers CV1 may be connected to upper surfaces of the first sidewalls SW1. The first covers CV1 may have a plane defined by the first and second directions DR1 and DR2. The first covers CV1 may extend longer in the first direction DR1 than in the second direction DR2.

The rear part BCV may be disposed on one side of the first bottom part BP1 in the first direction DR1 and the one side of the first sidewall SW1 in the first direction DR1. The rear part BCV may be connected to the one side of the first bottom part BP1 and the one side of the first sidewall SW1. The one side of the first sidewall SW1 may be adjacent to the one side of the first bottom part BP1.

In an embodiment, the rear part BCV may have a convex shape toward the outside to correspond to the convex curved shape on the one side of the first sidewall SW1. For example, when viewed in the second direction DR2, an outer surface of the rear part BCV that faces toward the outside may have a convex curved shape toward the outside.

Surfaces of the first sidewalls SW1 that face each other in the second direction DR2 may be defined as first inner surfaces IS1. Surfaces of the first sidewalls SW1 opposite to the first inner surfaces IS1 may be defined as outer surfaces OS. The first inner surfaces IS1 may define inner surfaces of the case CS that face each other in the second direction DR2. Specifically, the first inner surfaces IS1 may define inner surfaces of the first case CS1 that face each other in the second direction DR2.

The protrusions PRT may be disposed on the outer surfaces OS, respectively, and may extend in the first direction DR1. The protrusions PRT may protrude from the outer surfaces OS.

The guide rails GRA may be disposed on the first inner surfaces IS1. The guide rails GRA may be adjacent to the rear part BCV. The guide rails GRA may be connected to the first inner surfaces IS1.

Each of the guide rails GRA may include a first rail RA1, a second rail RA2, and a curved rail CRA. The first rail RA1 may extend in the first direction DR1. The second rail RA2 may be disposed under the first rail RA1 and may extend in the first direction DR1.

The curved rail CRA may extend from one side of the first rail RA1 to one side of the second rail RA2. The one side of the first rail RA1 and the one side of the second rail RA2 may be adjacent to the rear part BCV. The curved rail CRA may be adjacent to the rear part BCV and may have a convexly curved shape extending toward the rear part BCV.

The second case CS2 may include a second bottom part BP2, a front part FCV, a plurality of second sidewalls SW2, a plurality of second covers CV2, and a plurality of sub-support parts SSP. The second bottom part BP2 may have a plane defined by the first and second directions DR1 and DR2.

The second sidewalls SW2 may extend upward from both sides of the second bottom part BP2 opposite to each other in the second direction DR2. The second sidewalls SW2 may have a plane defined by the first and third directions DR1 and DR3. The second sidewalls SW2 may extend longer in the first direction DR1 than in the third direction DR3.

The second bottom part BP2 may be disposed under the first bottom part BP1. The second sidewalls SW2 may be disposed outward of the first sidewalls SW1. That is, the second sidewalls SW2 may be disposed on the outer surfaces OS of the first sidewalls SW1.

The front part FCV may be disposed to face the rear part BCV. The front part FCV may be disposed on one side of the second bottom part BP2 in the first direction DR1. The one side of the second bottom part BP2 may be defined as a portion of the second bottom part BP2 that is furthest from the rear part BCV. The front part FCV may be connected to the one side of the second bottom part BP2 and may extend upward.

The front part FCV may have a plane defined by the second and third directions DR2 and DR3. The front part FCV may extend longer in the second direction DR2 than in the third direction DR3.

In an embodiment, surfaces of the second sidewalls SW2 that face each other in the second direction DR2 may be defined as second inner surfaces IS2. Sliding grooves SGV may be defined on the second inner surfaces IS2. The sliding grooves SGV may extend in the first direction DR1. When the second case CS2 is coupled with the first case CS1 and the second sidewalls SW2 are disposed on the outer surfaces OS of the first sidewalls SW1, the protrusions PRT may be inserted into the sliding grooves SGV. This embodiment will be described below in detail.

The second covers CV2 may be disposed on the second sidewalls SW2. The second covers CV2 may be connected to upper surfaces of the second sidewalls SW2. The second covers CV2 may have a plane defined by the first and second directions DR1 and DR2. The second covers CV2 may extend longer in the first direction DR1 than in the second direction DR2. When the first case CS1 and the second case CS2 are coupled with each other, the second covers CV2 may be disposed on the first covers CV1, respectively.

The sub-support parts SSP may be disposed on the second inner surfaces IS2. The sub-support parts SSP may have a plane defined by the first and second directions DR1 and DR2. The sub-support parts SSP may extend longer in the first direction DR1 than in the second direction DR2. The sub-support parts SSP may be adjacent to the front part FCV. The sub-support parts SSP may be connected to the second inner surfaces IS2. The sub-support parts SSP may be disposed over the sliding grooves SGV.

Guide openings GOP may be defined in the first sidewalls SW1. The guide openings GOP may be defined in the first sidewalls SW1 by extending in the first direction DR1 from both sides of the first sidewalls SW1. The guide openings GOP may be defined above the guide rails GRA. For example, in an embodiment, the guide openings GOP may be defined above the first rails RAL.

The guide openings GOP may overlap the first rails RAL. The guide openings GOP may extend to be adjacent to the curved rails CRA. The first rail RA1 may extend to be closer to the opposite side of the first sidewall SW1 than the second rail RA2.

The first rails RA1 may extend below portions of the guide openings GOP. When the first case CS1 and the second case CS2 are coupled with each other, the sub-support parts SSP may be disposed in the guide openings GOP.

FIG. 10 is a plan view illustrating the support part accommodated in the first and second cases, CS1 and CS2, respectively, illustrated in FIG. 9.

In FIG. 10, an embodiment of the display module DM disposed on the support part SUP is illustrated by dotted lines. Furthermore, the support part SUP and the display module DM are illustrated in a flat state, and a folded state of the support part SUP and the display module DM will be illustrated in FIGS. 14 and 21.

Referring to FIG. 10, the support part SUP may extend longer in the first direction DR1 than in the second direction DR2. The support layer SUP may be disposed on the rear surface of the display module DM. Accordingly, the display module DM may be disposed on the support part SUP, and the support part SUP may support the display module DM.

In an embodiment, the support part SUP may include a support plate SPT and a plurality of link bars LKB. The support plate SPT may extend longer in the first direction DR1 than in the second direction DR2. The link bars LKB may be disposed on both side surfaces of the support plate SPT opposite to each other in the second direction DR2.

The support plate SPT may include a plastic material. For example, in an embodiment, the support plate may include polyamide (PA) and/or polycarbonate (PC). In this embodiment, the support plate SPT may be made of polycarbonate that is advantageous for processing an elastic body.

The link bars LKB may include a plastic material. In an embodiment, the link bars LKB may include a plastic material different from that of the support plate SPT. For example, the link bars LKB may include polyether sulfone (PES).

Physical properties of polycarbonate and polyether sulfone are listed in Table 1 immediately below.

TABLE 1

| Property | PC(Polycarbonate) | PES(Polyether sulfone) |
| --- | --- | --- |
| Density (g/cm3) | 1.2 | 1.37 |
| Tg (° C.) | 145 | 225 |
| Tensile elongation (%) | 100% | 50% |
| Application | Optical and Electronic Parts [Advantageous for Processing Elastic Body] | Aircraft Structural Material [Advantageous for High Heat Resistance and Long-term Durability] |

In an embodiment, the support plate SPT and the link bars LKB may be manufactured by double injection molding so as to be bonded to each other. The double injection molding may be defined as a method of injection molding two components of different materials at one time. The double injection molding is a generally well-known technology, and detailed description thereabout will be omitted. The support plate SPT may include a flat portion PLT, a flexible portion FLP extending from the flat portion PLT, and a sub-flat portion SPLT extending from the flexible portion FLP. For example, when the support plate SPT is unfolded flat, the flexible portion FLP may extend from the flat portion PLT in the first direction DR1, and the sub-flat portion SPLT may extend from the flexible portion FLP in the first direction DR1.

The flat portion PLT, the flexible portion FLP, and the sub-flat portion SPLT may be integrally formed of the same plastic material. In an embodiment, the flexible portion FLP may have a lower elastic modulus than the flat portion PLT and the sub-flat portion SPLT. That is, the flat portion PLT and the sub-flat portion SPLT may have higher elasticity than the flexible portion FLP, and the flexible portion FLP may have lower elasticity than the flat portion PLT and the sub-flat portion SPLT. The flexible portion FLP may be more flexible than the flat portion PLT.

Portions of the flexible portion FLP may have a shape different from that of the flat portion PLT such that the flexible portion FLP is more flexible than the flat portion PLT. For example, in an embodiment, the flexible portion FLP, when viewed in the second direction DR2, may include a plurality of first portions PT1 overlapping the link bars LKB and a plurality of second portions PT2 disposed between the link bars LKB.

The second portions PT2 may extend in the second direction DR2 and may be arranged in the first direction DR1. The second portions PT2 may be molded in a predetermined shape and may have a lower elastic modulus than the first portions PT1. In an embodiment, a specific shape of the second portions PT2 will be described below in detail with reference to FIGS. 12 and 13. The second portions PT2 may have a lower elastic modulus than the flat portion PLT. Since the second portions PT2 have a lower elastic modulus than the flat portion PLT, the flexible portion FLP may have a lower elastic modulus than the flat portion PLT.

The link bars LKB may be disposed on both side surfaces of the flexible portion FLP opposite to each other in the second direction DR2. Furthermore, the link bars LKB may be disposed on both side surfaces of the sub-flat portion SPLT opposite to each other in the second direction DR2. The link bars LKB may protrude in the second direction DR2. For example, the link bars LKB may protrude outwardly from both side surfaces of the flexible portion FLP and both side surfaces of the sub-flat portion SPLT.

The link bars LKB may be disposed in a plurality of grooves GV that may be defined on both side surfaces of the flexible portion FLP and both side surfaces of the sub-flat portion SPLT. Surfaces of the flexible portion FLP and surfaces of the sub-flat portion SPLT that define the grooves GV may be defined as inner surfaces of the flexible portion FLP and inner surfaces of the sub-flat portion SPLT. The link bars LKB may be disposed in the grooves GV and may make contact with the inner surfaces of the flexible portion FLP and the inner surfaces of the sub-flat portion SPLT.

Figure 11A:
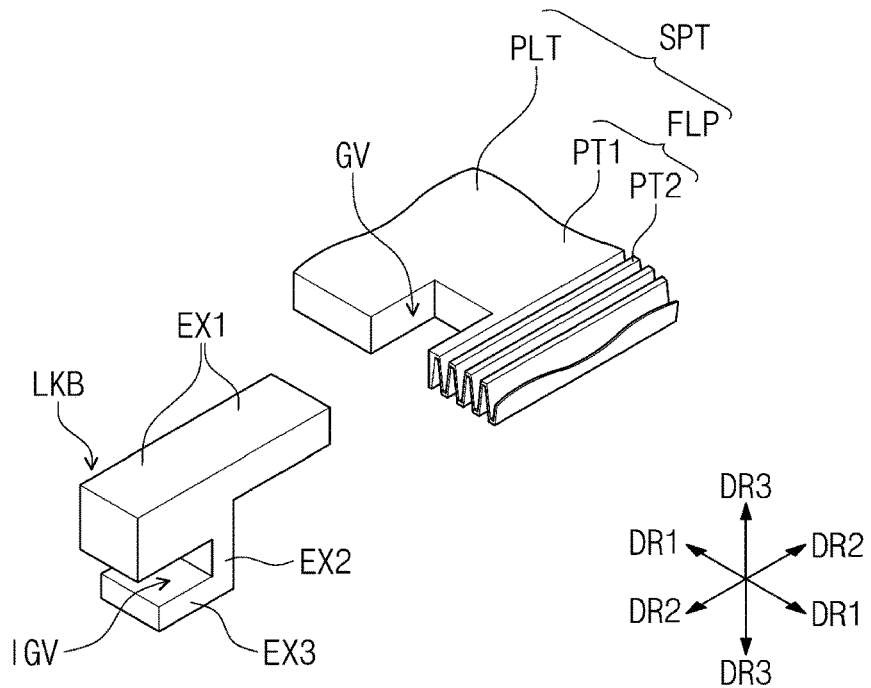
FIG. 11A is an exploded perspective view illustrating an uncoupled state of a link bar and a portion of a support plate illustrated in FIG. 10 according to an embodiment of the disclosure.

FIG. 11A is an exploded view of one link bar and a portion of the support plate illustrated in FIG. 10, in an embodiment.

Figure 11B:
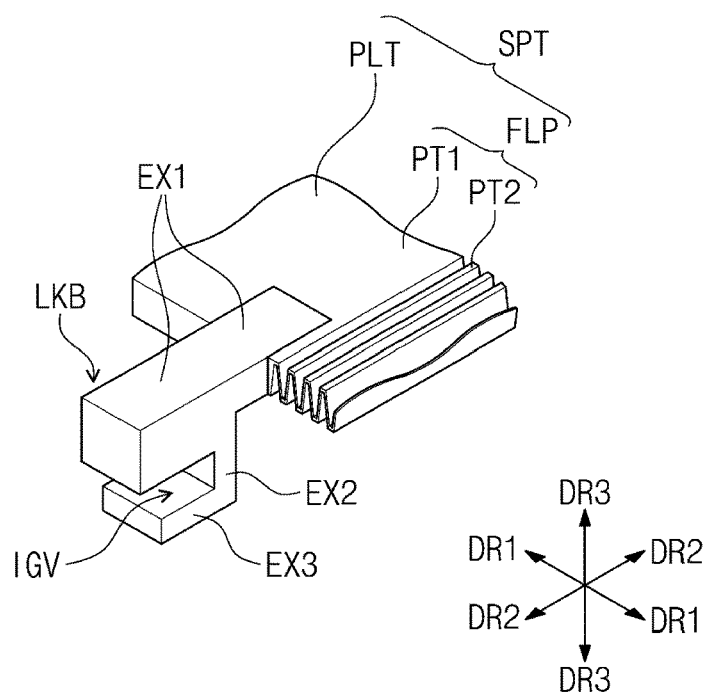
FIG. 11B is a perspective view illustrating a coupled state of the link bar and the support plate illustrated in FIG. 11A according to an embodiment of the disclosure.

FIG. 11B is a view illustrating the link bar and the support plate illustrated in FIG. 11A coupled together.

In FIGS. 11A and 11B, an embodiment of the leftmost link bar LKB in FIG. 10 is illustrated.

Referring to FIGS. 11A and 11B, an embodiment of a groove GV may be defined on a side surface of the support plate SPT. A link bar LKB may be disposed in the groove GV and may make contact with the support plate SPT. The groove GV may be defined by being depressed in the second direction DR2 from the side surface of the support plate SPT.

The link bar LKB may include a first extension EX1, a second extension EX2, and a third extension EX3. The first extension EX1 may extend in the second direction DR2. A portion of the first extension EX1 that faces toward the support plate SPT may be disposed in the groove GV.

The second extension EX2 may extend downward from a portion of the first extension EX1. The third extension EX3 may extend from a lower end of the second extension EX2 in the second direction DR2 and may face the first extension EX1 in the third direction DR3. A space between the first, second, and third extensions EX1, EX2, and EX3, respectively, may be defined as an insertion groove IGV. The insertion groove IGV may be defined at an end of the link bar LKB that faces toward the outside.

The above-described guide rail GRA may be disposed in the insertion groove IGV, and thus the link bars LKB may be coupled to the guide rail GRA. This embodiment will be described below in detail.

Figure 12:
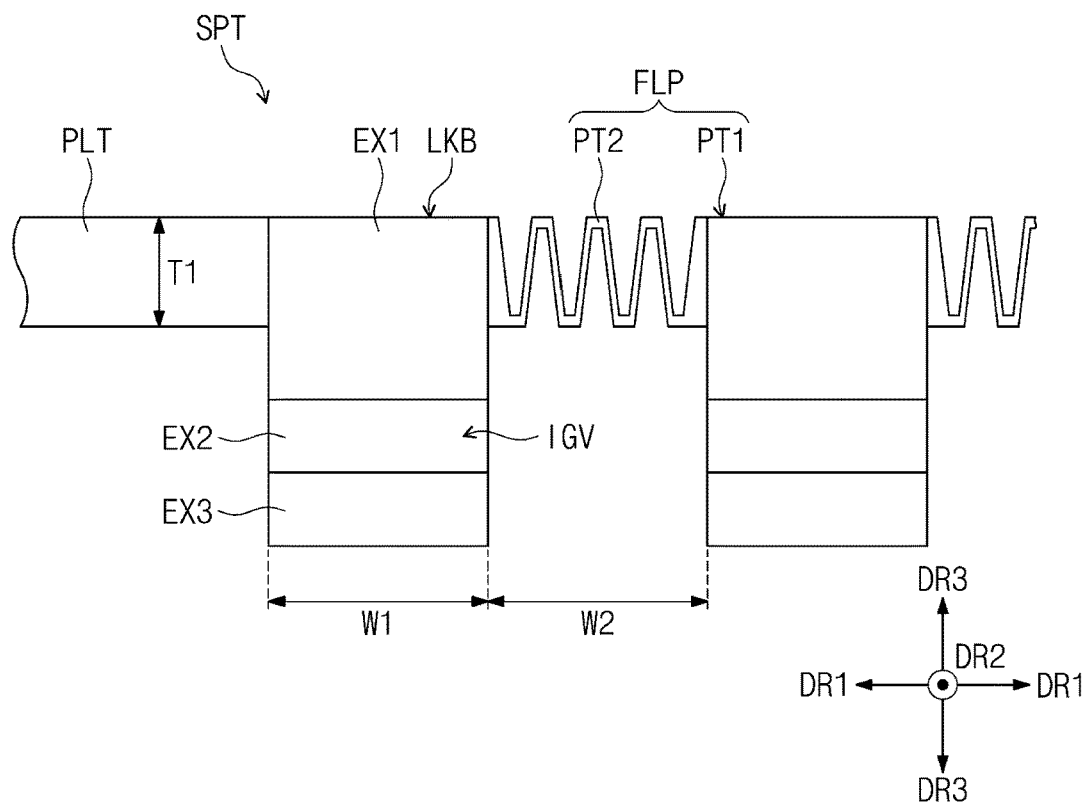
FIG. 12 is a side view of some link bars and a second portion adjacent to a flat portion illustrated in FIG. 10 as viewed in a second direction according to an embodiment of the disclosure.
Figure 13:
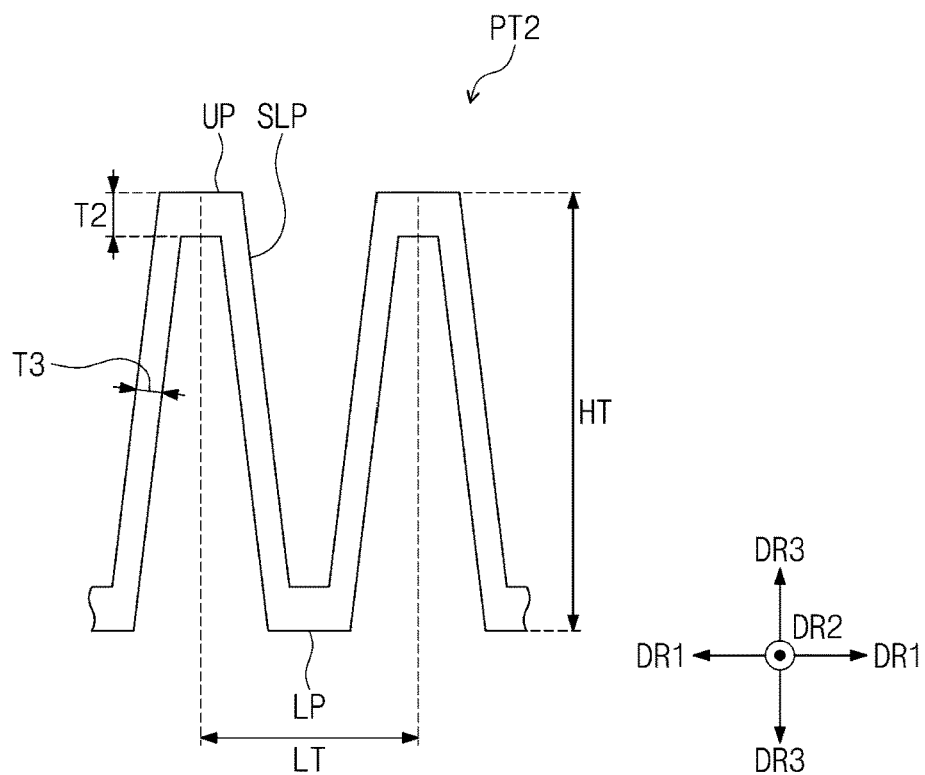
FIG. 13 is an enlarged view of the second portion illustrated in FIG. 12 according to an embodiment of the disclosure.

FIG. 12 is a side view of some of the link bars LKB and the second portion PT2 adjacent to the flat portion illustrated in FIG. 10 as viewed in the second direction DR2. FIG. 13 is an enlarged view of the second portion PT2 illustrated in FIG. 12.

Referring to FIGS. 10 and 12, an embodiment of the link bars LKB may be disposed on the flexible portion FLP extending from the flat portion PLT. The second portion PT2 of the flexible portion FLP may be disposed between the link bars LKB. The second portion PT2 may extend in a zigzag pattern in the first direction DR1. Grooves may be defined on an upper surface of the second portion PT2, and grooves may be defined on a lower surface of the second portion PT2. Accordingly, in an embodiment, the second portion PT2 may have a zigzag shape.

An upper surface and a lower surface of the flat portion PLT may have a flat surface, and the flat portion PLT may have a predetermined thickness. However, since the grooves are formed on the upper surface and the lower surface of the second portion PT2, in an embodiment, the second portion PT2 may not have a predetermined thickness and may extend to have a zigzag pattern. In this embodiment, the second portion PT2 may be more flexible than the flat portion PLT. Accordingly, the elastic modulus of the second portion PT2 may be lower than the elastic modulus of the flat portion PLT.

For example, in an embodiment, the flat portion PLT may have an elastic modulus of 6 GPa to 12 GPa. The second portion PT2 may have an elastic modulus of 1 MPa to 100 MPa. Since the flexible portion FLP includes the second portion PT2 having a zigzag pattern, the flexible portion FLP may have a lower elastic modulus than the flat portion PLT. Accordingly, the flexible portion FLP may be more easily bent.

In an embodiment, the thickness T1 of the flat portion PLT in the third direction DR3 may range from 200 micrometers ($\mu$m) to 500 micrometers ($\mu$m). The width W1 of each of the link bars LKB in the first direction DR1 may range from 0.8 millimeters (mm) to 1.2 millimeters (mm). The width W2 of the second portion PT2 in the first direction DR1 may range from 0.8 millimeters (mm) to 1.2 millimeters (mm). That is, the width W2 of the second portion PT2 in the first direction DR1 may be equal to the width W1 of each of the link bars LKB. However, embodiments of the disclosure are not limited thereto, and the width W2 of the second portion PT2 may differ from the width W1 of each of the link bars LKB.

Referring to FIGS. 10 and 13, an embodiment of the second portion PT2 may include a plurality of lower end portions LP, a plurality of upper end portions UP, and a plurality of inclined portions SLP. The lower end portions LP may extend in the second direction DR2 and may be arranged in the first direction DR1. The upper end portions UP may be disposed above the lower end portions LP. The upper end portions UP may extend in the second direction DR2 and may be arranged in the first direction DR1.

When viewed on the plane, the upper end portion UP may be spaced apart from the lower end portion LP in the first direction DR1 and may be disposed between the lower end portions LP. That is, the upper end portions UP and the lower end portions LP may be alternately disposed in the first direction DR1.

The inclined portions SLP may have a predetermined inclination angle with respect to the third direction DR3 and may extend from the upper end portions UP to the lower end portions LP. The inclined portions SLP may extend from the upper end portions UP to the lower end portions LP to form an obtuse angle with the upper end portions UP and the lower end portions LP. Each of the inclined portions SLP may connect lateral portions of the upper and lower end portions UP and LP adjacent thereto.

According to this an embodiment of the upper end portions UP and the inclined portions SLP may be disposed in a trapezoidal form. Furthermore, the lower end portions LP and the inclined portions SLP may be disposed in an inverted trapezoidal form.

The thickness T2 of each of the upper end portions UP and the lower end portions LP may range from 40 micrometers ($\mu$m) to 100 micrometers ($\mu$m). In this specification, a thickness may be defined as a numerical value measured in a direction perpendicular to an extension direction of a corresponding component. Accordingly, the thickness T2 of each of the upper end portions UP and the lower end portions LP may be defined as a numerical value measured in the third direction DR3. The thickness T3 of each of the inclined portions SLP may range from 20 micrometers ($\mu$m) to 80 micrometers ($\mu$m).

The distance LT from the center of the $h^{th}$ upper end portion UP to the center of the $(h+1)^{th}$ upper end portion UP in the first direction DR1 may range from 100 micrometers ($\mu$m) to 250 micrometers ($\mu$m), where "h" is a natural number. The distance LT may be defined as the pitch of the zigzag pattern of the flexible portion FLP.

The height HT of the second portion PT2 defined as the distance between an upper surface of each of the upper end portions UP and a lower surface of each of the lower end portions LP in the third direction DR3 may range from 200 micrometers ($\mu$m) to 500 micrometers ($\mu$m). That is, the height HT of the second portion PT2 may be equal to the thickness T1 of the flat portion PLT.

Figure 14:
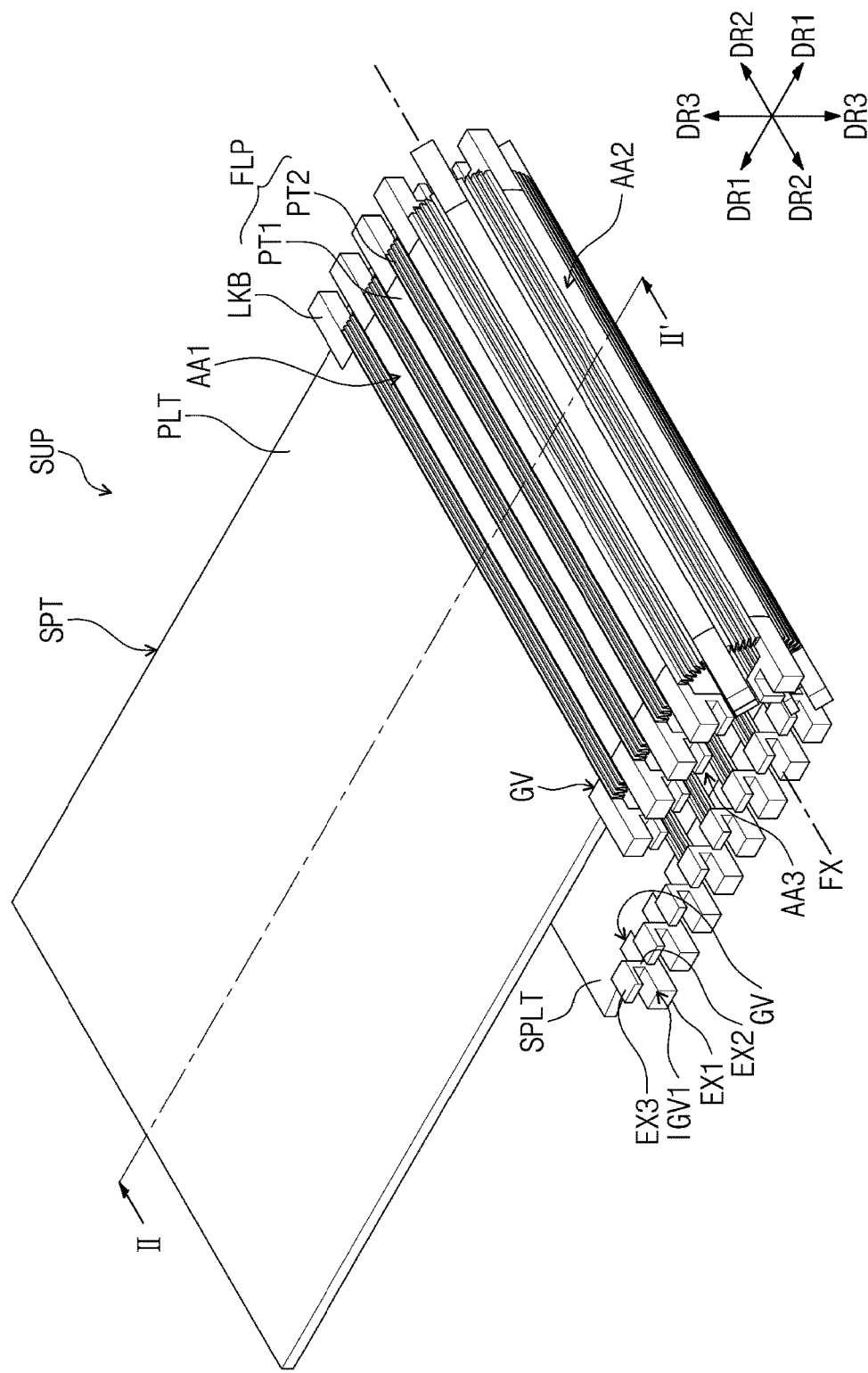
FIG. 14 is a perspective view illustrating a folded state of the support plate illustrated in FIG. 10 according to an embodiment of the disclosure.

FIG. 14 is a view illustrating a folded state of the support plate illustrated in FIG. 10.

Referring to FIGS. 10 and 14, an embodiment of the flexible portion FLP may be more flexible than the flat portion PLT and may be easily folded. The flexible portion FLP may be folded such that part of the flexible portion FLP is disposed under the flat portion PLT. The flexible portion FLP may be folded about a folding axis FX extending in one direction, and, in one embodiment, for example, the one direction may be the second direction DR2. When the flexible portion FLP is folded, the sub-flat portion SPLT may also be disposed under the flat portion PLT. As the flexible portion FLP is folded, the support plate SPT may be accommodated in the above-described case CS.

A first region AA1 of the flexible portion FLP that is adjacent to the flat portion PLT may be disposed in a flat state together with the flat portion PLT. A second region AA2 of the flexible portion FLP may be folded in a curved shape having a predetermined curvature. The radius of curvature of the second region AA2 may be set to 1 millimeter (mm) to 5 millimeters (mm). A third region AA3 of the flexible portion FLP may be disposed in a flat state under the flat portion PLT and may face the flat portion PLT.

The link bars LKB may be disposed on both sides of the flexible portion FLP and may be arranged along both sides of the flexible portion FLP. The link bars LKB disposed in the first region AA1 and/or the link bars LKB disposed in the third region AA3 may be disposed in a flat state. The link bars LKB disposed in the second region AA2 may be arranged in a curved form.

The link bars LKB may be disposed on both sides of the sub-flat portion SPLT and may be arranged along both sides of the sub-flat portion SPLT. The link bars LKB disposed on both sides of the sub-flat portion SPLT may be disposed in a flat state.

Figure 15:
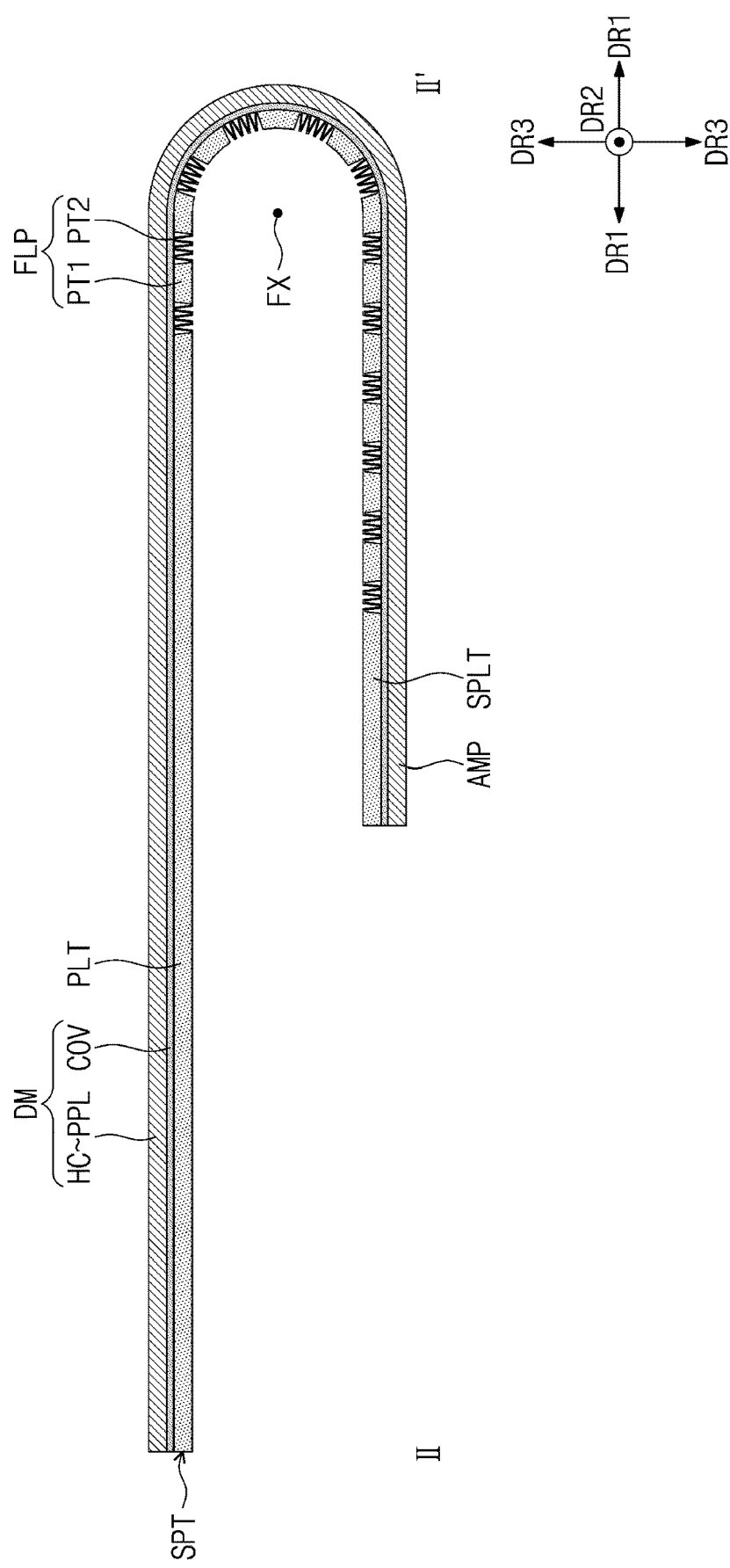
FIG. 15 is a sectional view of the support plate taken along line II-II' illustrated in FIG. 14.

FIG. 15 is a sectional view taken along line II-II' illustrated in FIG. 14.

In FIG. 15, an embodiment of the display module DM is illustrated together with the support plate SPT. Furthermore, the layers from the hard coating layer HC to the panel protection layer PPL of the display module DM are illustrated as a single layer in FIG. 15.

Referring to FIGS. 5, 14, and 15, an embodiment of the display module DM may further include a cover layer COV. The cover layer COV may be disposed between the panel protection layer PPL and the support plate SPT. The cover layer COV may include thermoplastic polyurethane (TPU) or rubber. However, the material of the cover layer COV is not limited thereto.

The display module DM may be attached to the support plate SPT. In an embodiment, for example, the cover layer COV may be attached to the support plate SPT and the panel protection layer PPL through an adhesive such as a pressure sensitive adhesive (not illustrated). The cover layer COV may absorb an external impact.

As the flexible portion FLP is folded, the display module DM may be folded along the flexible portion FLP. The accommodated portion AMP may be disposed under the sub-flat portion SPLT and may be attached to the sub-flat portion SPLT.

Figure 16:
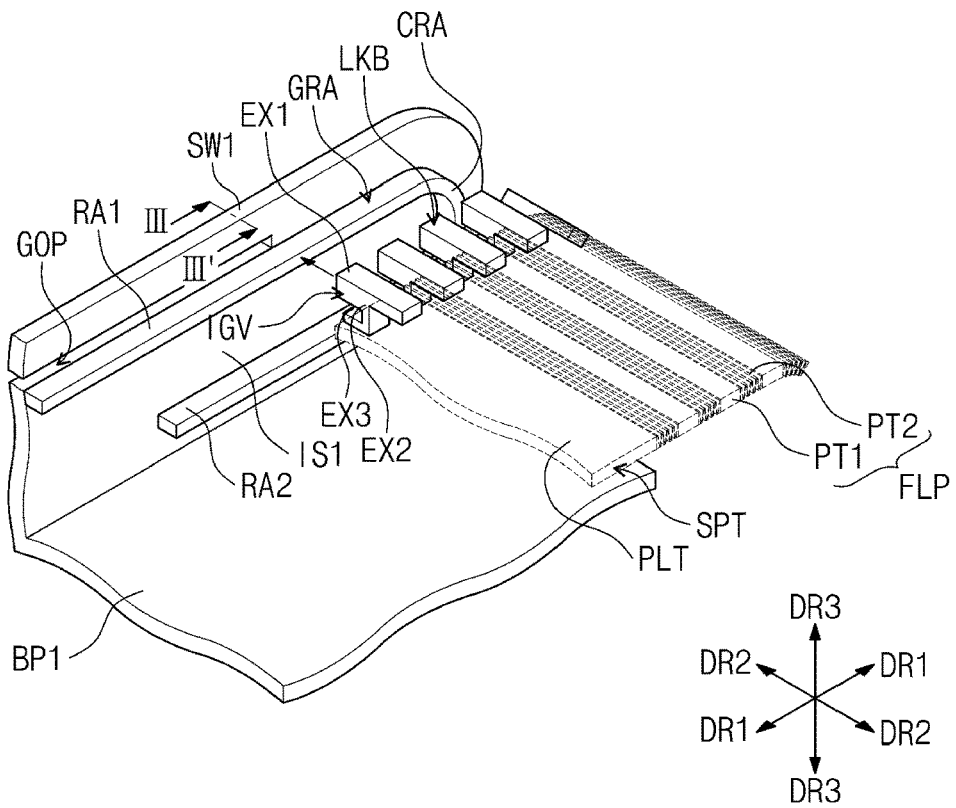
FIG. 16 is an isometric view illustrating a configuration in which link bars illustrated in FIG. 10 are coupled to a guide rail illustrated in FIG. 9 according to an embodiment of the disclosure.
Figure 17:
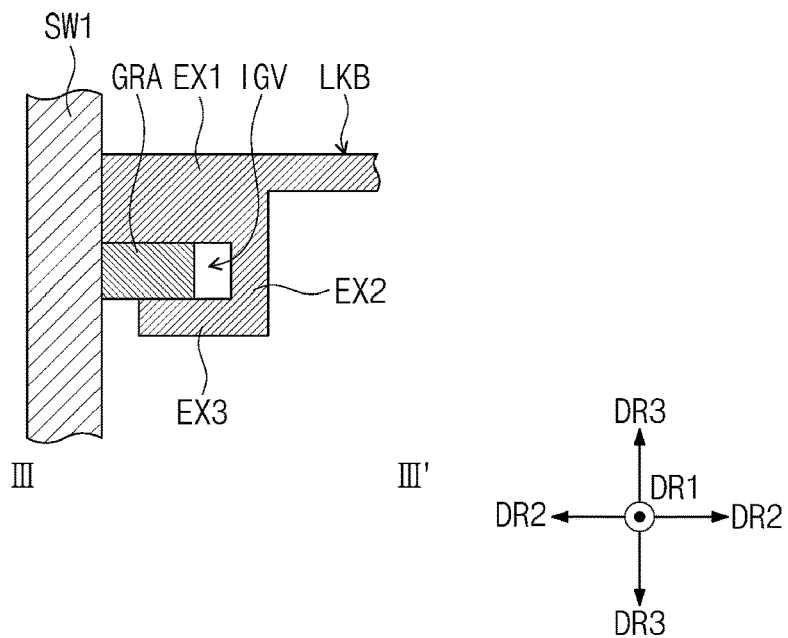
FIG. 17 is a sectional view taken along line III-III' illustrated in FIG. 16.

FIG. 16 is a view for describing a configuration in which the link bars illustrated in FIGS. 10 to 14 are coupled to the guide rail illustrated in FIG. 9. FIG. 17 is a sectional view taken along line III-III' illustrated in FIG. 16.

In FIG. 16, an embodiment of a portion of the first sidewall SW1 is illustrated. Furthermore, some of the link bars LKB illustrated in FIG. 10 are illustrated in FIG. 16, and the support plate SPT is illustrated by dotted lines.

Referring to FIGS. 16 and 17, an embodiment of the guide rail GRA may be connected to the first sidewall SW1. The link bars LKB may be coupled to the guide rail GRA. For example, in one embodiment, the guide rail GRA may be disposed in the insertion grooves IGV defined at the ends of the link bars LKB. That is, the guide rail GRA may be disposed in the insertion grooves IGV defined between the first, second, and third extensions EX1, EX2, and EX3, respectively.

As the guide rail GRA is disposed in the insertion grooves IGV, the link bars LKB may be coupled to the guide rail GRA. The link bars LKB may move along the guide rail GRA. The link bars LKB may move in the extension direction of the guide rail GRA through the insertion grooves IGV.

The flexible portion FLP of the support plate SPT may be coupled to the guide rail GRA through the link bars LKB. The flexible portion FLP may move in the extension direction of the guide rail GRA as the link bars LKB move.

Figure 18:
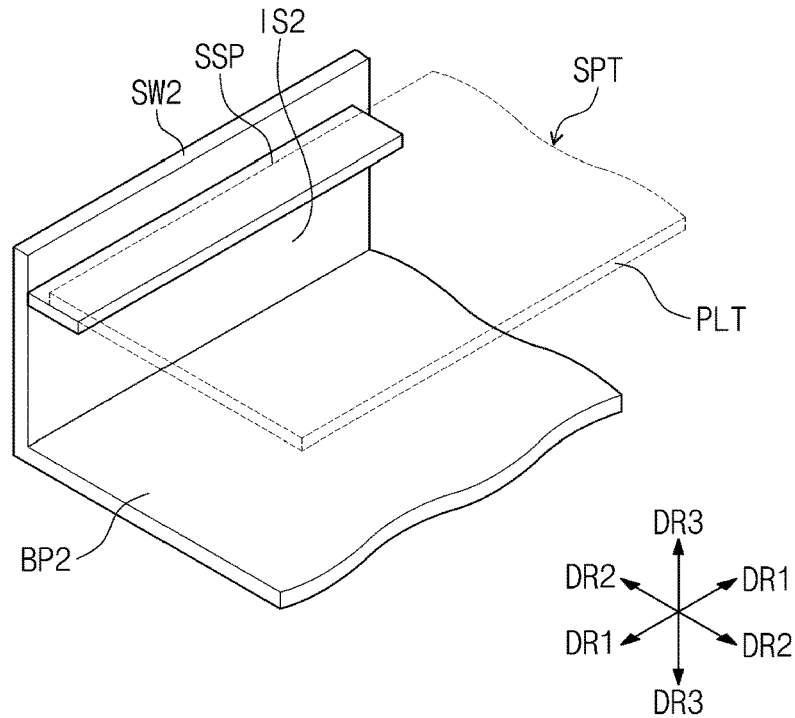
FIG. 18 is an isometric view illustrating a state in which the support plate illustrated in FIG. 10 is disposed on a sub-support part illustrated in FIG. 9 according to an embodiment of the disclosure.

FIG. 18 is an isometric view illustrating an embodiment in which the support plate illustrated in FIG. 10 is disposed on the sub-support part illustrated in FIG. 9.

In FIG. 18, a portion of the second sidewall SW2, a portion of the second bottom part BP2, and the sub-support part SSP are illustrated, and the support plate SPT is illustrated by dotted lines.

Referring to FIG. 18, an embodiment of the flexible portion FLP of the support plate SPT may be coupled to the guide rail GRA through the link bars LKB. However, the flat portion PLT may not be coupled to the guide rail GRA. Accordingly, a structure for supporting the flat portion PLT of the support plate SPT is required. In an embodiment of the disclosure, the sub-support part SSP may be disposed under the flat portion PLT and may support the flat portion PLT.

Figure 19:
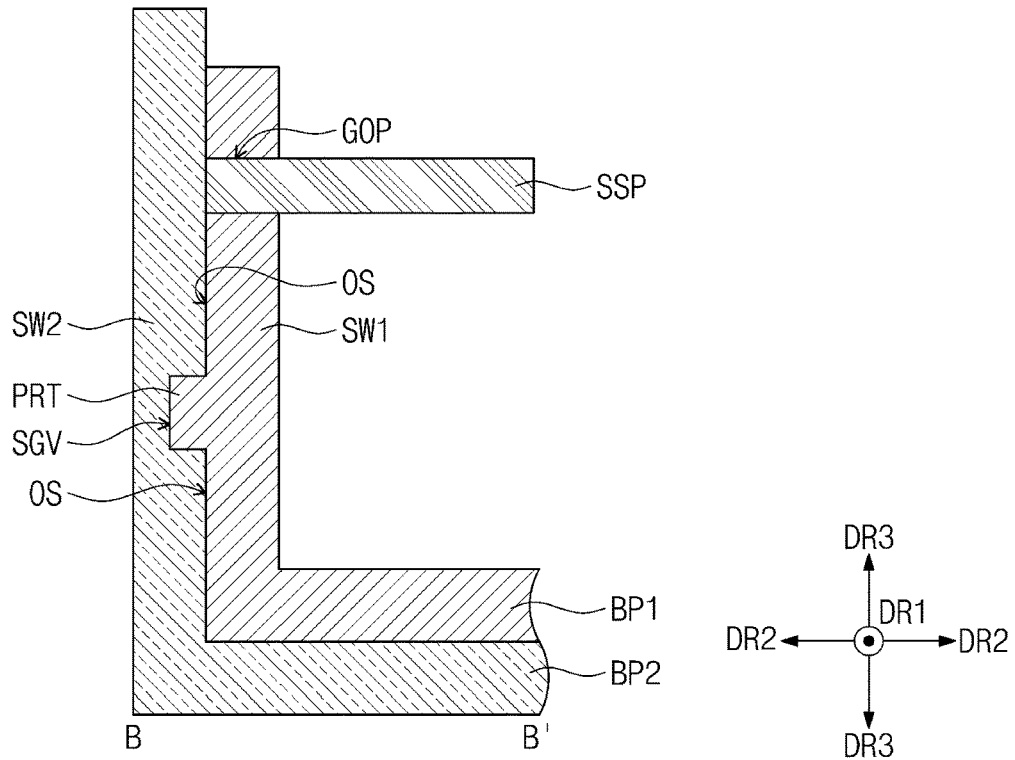
FIG. 19 is a sectional view of the case illustrated in FIG. 1 taken along line B-B' illustrated in FIG. 9.

FIG. 19 is a sectional view taken along line B-B' illustrated in FIG. 9. FIGS. 20A and 20B are sectional views taken along line B1-B1' illustrated in FIG. 9.

In FIG. 19, the first and second cases CS1 and CS2 are shown coupled with each other, the first sidewall SW1 and the second sidewall SW2 are illustrated together. FIGS. 20A and 20B illustrate a state in which the protrusion PRT is disposed in the sliding groove SGV.

Referring to FIGS. 9 and 19, an embodiment of the second bottom part BP2 may be disposed under the first bottom part BP1 when the first and second cases CS1 and CS2 are coupled with each other. The second bottom part BP2 may make contact with the lower surface of the first bottom part BP1.

The second sidewall SW2 may be disposed outward of the first sidewall SW1. The second sidewall SW2 may be disposed to make contact with the outer surface OS of the first sidewall SW1.

The protrusion PRT may protrude from the first sidewall SW1. When the first and second cases CS1 and CS2, respectively, are coupled with each other, the protrusion PRT may be disposed in the sliding groove SGV defined in the second sidewall SW2.

The sub-support part SSP may be connected to the second sidewall SW2. The sub-support part SSP may be disposed in the guide opening GOP defined in the first sidewall SW1. When the first and second cases CS1 and CS2, respectively, move relative to each other in the first direction DR1, the sub-support part SSP may move along the guide opening GOP in the first direction DR1.

Referring to FIGS. 1, 9, 19, and 20A, in the default mode, the protrusion PRT may be disposed on one side of the sliding groove SGV. The one side of the sliding groove SGV may be adjacent to the front part FCV in the first direction DR1. When the second case CS2 moves toward the first case CS1 in the first direction DR1 to the maximum, the protrusion PRT may be disposed on the one side of the sliding groove SGV.

Referring to FIGS. 2, 9, 19, and 20B, in the extended mode, the first case CS1 may move away from the second case CS2 in the first direction DR1. For example, when the first case CS1 moves in the first direction DR1, the protrusion PRT may move along the sliding groove SGV in the first direction DR1. When the protrusion PRT moves along the sliding groove SGV and is disposed on an opposite side of the sliding groove SGV, the protrusion PRT may stop the first case CS1 from moving relative to the second case CS2.

The opposite side of the sliding groove SGV may be a portion of the sliding groove SGV that is furthest from the front part FCV. The one side and the opposite side of the sliding groove SGV may be opposite to each other in the first direction DR1.

In an embodiment, when the first case CS1 continually moves away from the second case CS2, the first case CS1 may be separated from the second case CS2. However, in an embodiment of the disclosure, the first case CS1 may stop as the protrusion PRT moving in the first direction DR1 is disposed on the opposite side of the sliding groove SGV. The amount of movement of the first case CS1 may be controlled depending on the lengths of the protrusion PRT and the sliding groove SGV in the first direction DR1.

In the default mode illustrated in FIG. 1 and the extended mode illustrated in FIG. 2, the amount of movement of the first case CS1 relative to the second case CS2 may be determined by the protrusion PRT moving along the sliding groove SGV in the first direction DR1.

Figure 21:
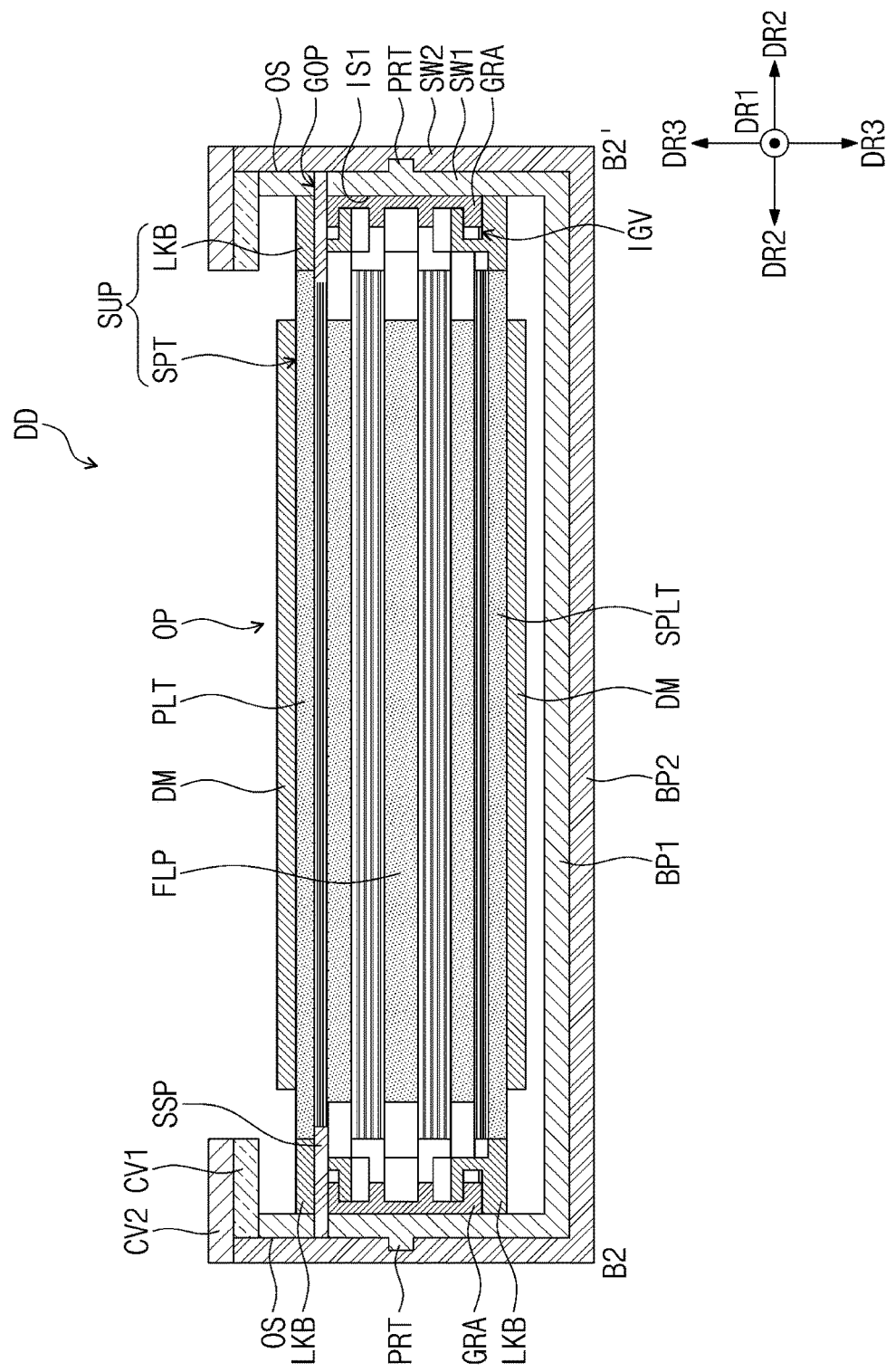
FIG. 21 is a sectional view of the case in FIG. 1 taken along line B2-B2' illustrated in FIG. 9.

FIG. 21 is a sectional view taken along line B2-B2' illustrated in FIG. 9.

In FIG. 21, the support part SUP and the display module DM accommodated in the first case CS1 are illustrated together with the first case CS1, and the first case CS1 and the second case CS2 are illustrated in a coupled state.

Referring to FIGS. 9, 14, and 21, in an embodiment, the protrusions PRT may be disposed on the outer surfaces OS of the first sidewalls SW1. The guide rails GRA may be disposed on the first inner surfaces IS1 of the first sidewalls SW1. The guide rails GRA may face each other in the second direction DR2. The sub-support parts SSP connected to the second inner surfaces IS2 may face each other in the second direction DR2.

As the guide rails GRA are disposed in the insertion grooves IGV of the link bars LKB, the link bars LKB may be coupled to the guide rails GRA. The flat portion PLT may be disposed on the sub-support plates SSP connected to the second sidewalls SW2. The sub-support parts SSP may support the flat portion PLT.

An embodiment of the support plate SPT may be disposed on the rear surface of the display module DM. The support plate SPT may support the display module DM. As the flexible portion FLP is coupled to the guide rails GRA by the link bars LKB and the flat portion PLT is supported by the sub-support parts SSP, the support plate SPT may easily support the display module DM.

When viewed on the plane, the display module DM may be disposed between the link bars LKB. That is, when viewed on the plane, the display module DM may be disposed so as not to overlap the link bars LKB.

In an embodiment, the first covers CV1 may be disposed on the first sidewalls SW1. The first covers CV1 may extend in the second direction DR2 on the first sidewalls SW1. The first covers CV1, when viewed on the plane, may be disposed to overlap the link bars LKB. As the first covers CV1 cover the link bars LKB, the link bars LKB may not be visible from the outside.

The second covers CV2 may be disposed on the second sidewalls SW2 and the first covers CV1. The second covers CV2, when viewed on the plane, may be disposed to overlap the link bars LKB. As the second covers CV2 cover the link bars LKB, the link bars LKB may not be visible from the outside.

The display module DM may be exposed to the outside through the opening OP defined between the first covers CV1 and between the second covers CV2.

Figure 22:
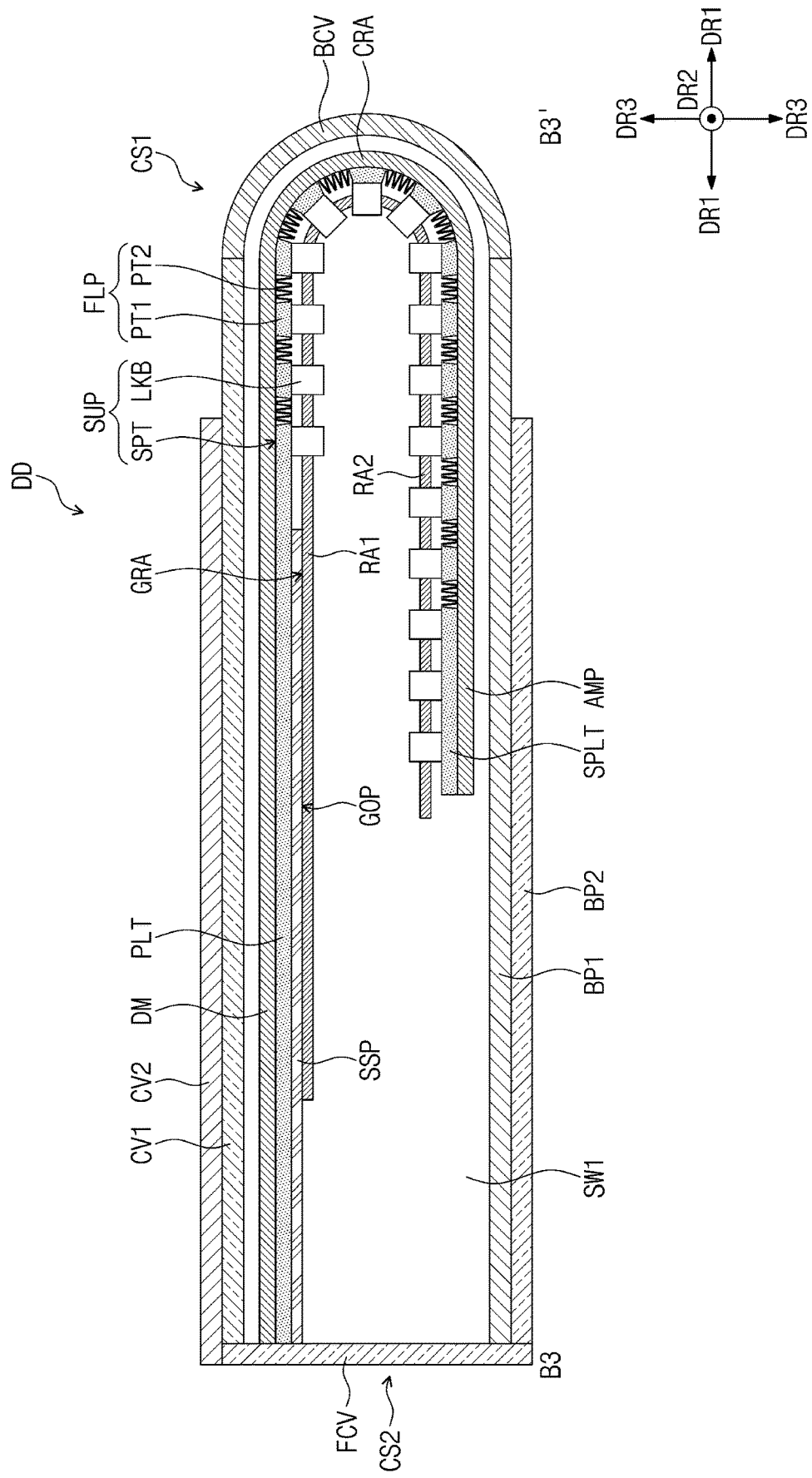
FIG. 22 is a sectional view of the case in FIG. 1 taken along line B3-B3' illustrated in FIG. 9, where the display device is illustrated in a default mode according to an embodiment.
Figure 23:
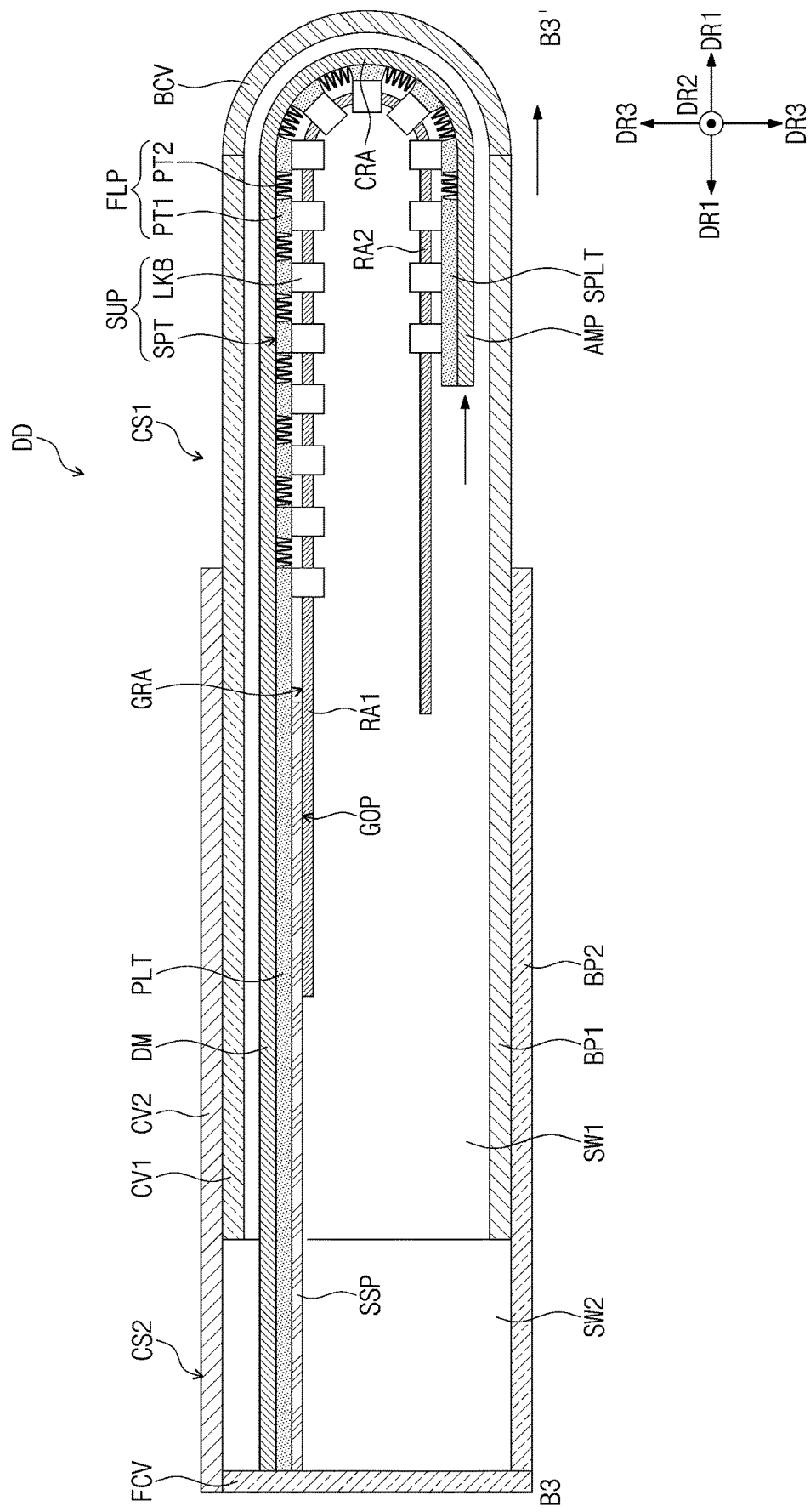
FIG. 23 is a sectional view of the case of FIG. 1 taken along line B3-B3' illustrated in FIG. 9, where the display device is illustrated in the extended mode according to an embodiment.

FIG. 22 is a sectional view taken along line B3-B3' illustrated in FIG. 9, where FIG. 22 illustrates the default mode of the display device. FIG. 23 is a sectional view taken along line B3-B3' illustrated in FIG. 9, where FIG. 23 illustrates the extended mode of the display device.

In FIGS. 22 and 23, the display module DM and the support part SUP accommodated in the case CS are illustrated together with the case CS.

Referring to FIGS. 1 and 22, an embodiment of the display module DM may be disposed on the support plate SPT. The support plate SPT may be folded and accommodated in the case CS. The flat portion PLT may be disposed on the sub-support part SSP, and the flexible portion FLP may be folded and coupled to the guide rail GRA. As the link bars LKB are arranged in the shape of the guide rail GRA and coupled to the guide rail GRA, the flexible portion FLP may also be disposed in the shape of the guide rail GRA.

The sub-flat portion SPLT may be disposed under the flat portion PLT, and the link bars LKB coupled to the sub-flat portion SPLT may be arranged in the first direction DR1. The link bars LKB coupled to the sub-flat portion SPLT may be coupled to the second rail RA2.

In an embodiment, the flexible portion FLP may be more flexible than the flat portion PLT and may be more easily bent and disposed along the guide rail GRA. Since the second portions PT2 of the flexible portion FLP have a low elastic modulus as described above, the flexible portion FLP may be easily bent.

In an embodiment, one side of the display module DM and one side of the support plate SPT may be connected to the front part FCV. Accordingly, the display module DM and the support plate SPT may be connected and fixed to the front part FCV.

The accommodated portion AMP of the display module DM may be disposed under the sub-flat portion SPLT. The accommodated portion AMP and the sub-flat portion SPLT may be disposed in the case CS and may not be exposed to the outside.

In the default mode, the sub-support part SSP may be disposed in the guide opening GOP and an end of the first rail RA1 may be disposed under the sub-support part SSP. One end of the sub-support part SSP may be adjacent to the link bar LKB that is disposed in the first rail RAL.

Referring to FIGS. 2 and 23, in the extended mode, the first case CS1 may be movable away from the second case CS2 in the first direction DR1. Accordingly, the display module DM and the support plate SPT may be extended to the outside.

The link bars LKB may move along the guide rail GRA. The flexible portion FLP may move along the guide rail GRA depending on the movement of the link bars LKB. The flexible portion FLP may move such that part of the flexible portion FLP is extended to the outside.

The sub-support part SSP may move relative to the first case CS1 in the first direction DR1. The sub-support part SSP may be disposed in the guide opening GOP and may move in the first direction DR1 along the guide opening GOP. An end of the first rail RA1 may be disposed under the guide opening GOP. In the extended mode, some of the link bars LKB may be disposed to overlap the guide opening GOP.

In the extended mode, the sub-support part SSP may support the flat portion PLT and the display module DM on the flat portion PLT. Furthermore, in the extended mode, the display module DM on the flat portion FLP and disposed to be flat may be supported by the link bars LKB horizontally arranged in the first direction DR1. Accordingly, in the extended mode, the display module DM may be easily supported by the sub-support part SSP and/or the link bars LKB adjacent to each other.

As the area of the display module DM exposed to the outside in the extended mode is expanded, the area of the display surface DS exposed to the outside may also be expanded. When the display device is changed from the extended mode to the default mode, the front part FCV and the first case CS1 illustrated in FIG. 23 move toward each other in the first direction DR1. Accordingly, the default mode illustrated in FIG. 22 may be achieved.

In the extended mode, the accommodated portion AMP and the sub-flat portion SPLT may be disposed in the case CS and may not be exposed to the outside. In the extended mode, the sub-flat portion SPLT may not move to the curved rail CRA. Accordingly, since the sub-flat portion SPLT does not need to be flexible, the second portion PT2 having a zigzag pattern may not be formed in the sub-flat portion SPLT.

According to an embodiment of the disclosure, the support plate SPT including the flat portion PLT having a high elastic modulus and the flexible portion FLP having a low elastic modulus may support the display module, and the flexible portion FLP may be more easily folded together with the display module DM and may be accommodated in the case CS.

The link bars LKB disposed on both side surfaces of the flexible portion FLP may be coupled to the guide rail GRA of the case CS and may move along the guide rail GRA. Accordingly, configuring the display module DM between the default mode and the extended mode may be easily performed. An embodiment of the support plate SPT and the link bars LKB may not include a metallic material, but may include a plastic material. Accordingly, the display device DD may be made light in weight.

Figure 24:
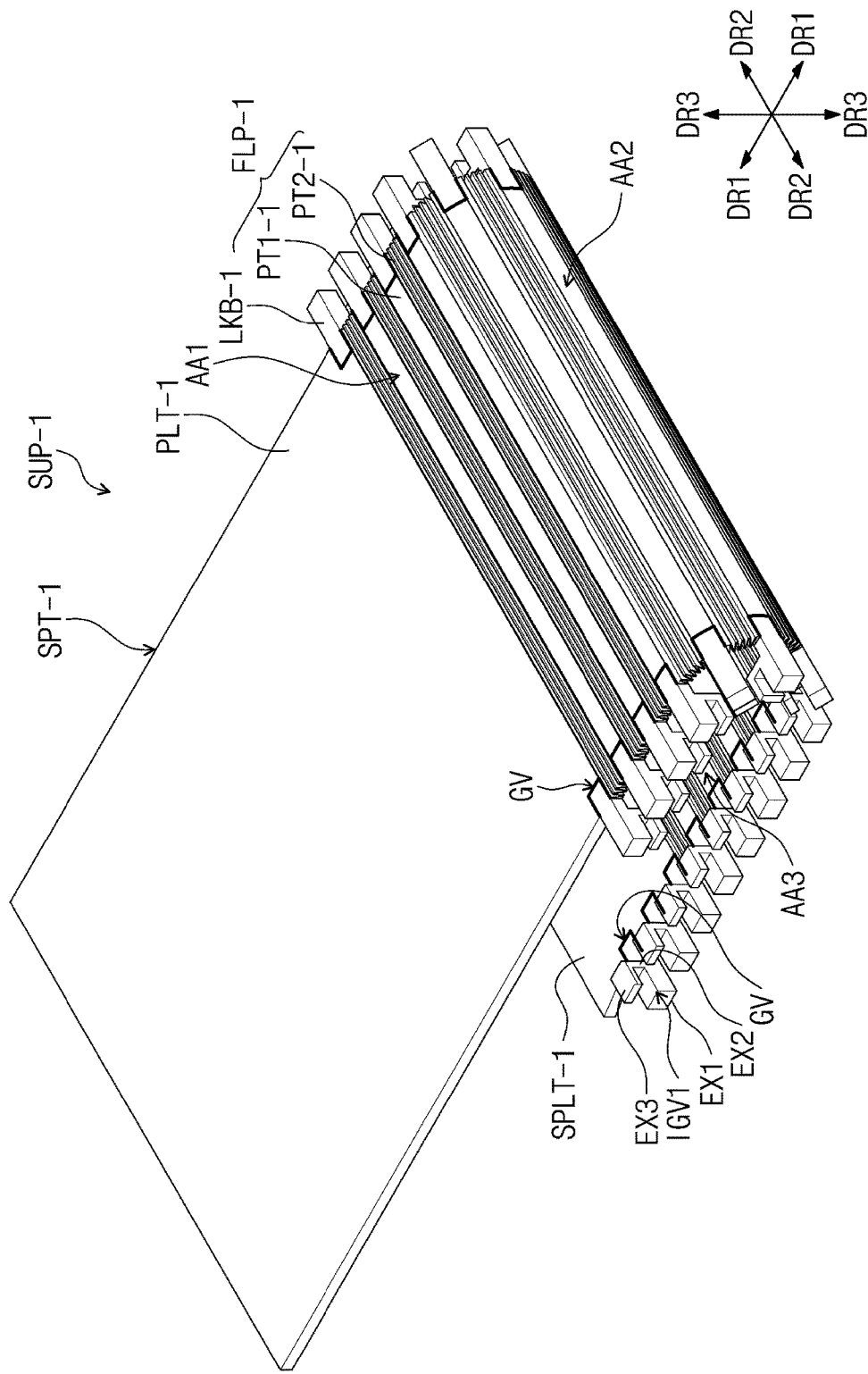
FIG. 24 is a perspective view illustrating a configuration of a support part according to an embodiment of the disclosure.
Figure 25:
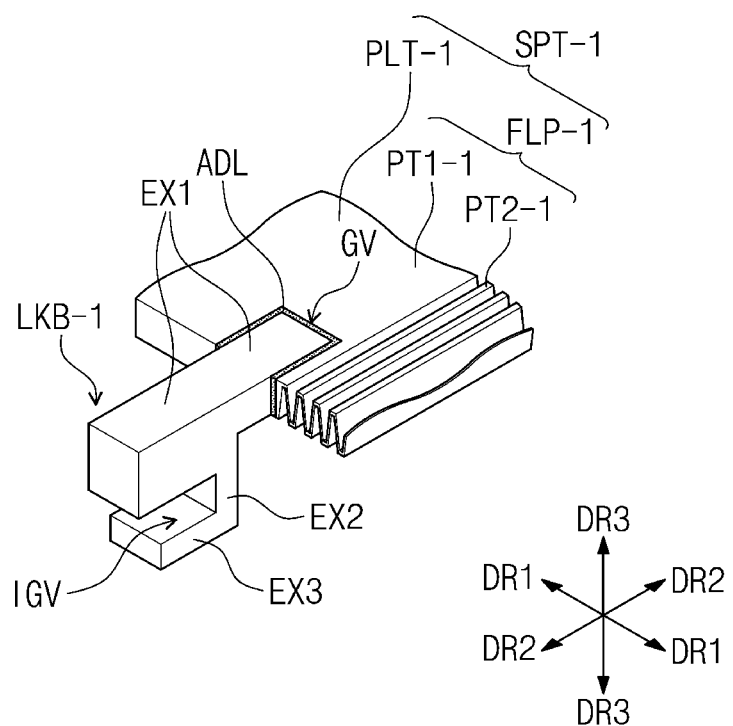
FIG. 25 is an isometric view illustrating a coupled state of a link bar and a support plate of the support part illustrated in FIG. 24 according to an embodiment.

FIG. 24 is a view illustrating a configuration of a support part according to an embodiment of the disclosure. FIG. 25 is a view illustrating an embodiment of a coupled state of one link bar and a support plate illustrated in FIG. 24.

FIG. 24 is a perspective view corresponding to FIG. 14, and FIG. 25 is a perspective view corresponding to FIG. 11B.

The following description will be focused on a difference between an embodiment of the support part SUP illustrated in FIGS. 10 to 14 and an embodiment of the support part SUP-1 illustrated in FIG. 24.

Referring to FIGS. 24 and 25, an embodiment of the support part SUP-1 may include the support plate SPT-1 and a plurality of link bars LKB-1. The shapes of the support plate SPT-1 and the link bars LKB-1 may be substantially the same as the shapes of the support plate SPT and the link bars LKB illustrated in FIG. 14. However, the support plate SPT-1 and the link bars LKB-1 may include materials different from those of the support plate SPT and the link bars LKB illustrated in FIG. 14.

The support plate SPT-1 may include glass. A surface of the glass may be tempered, and thus the glass may be used as the support plate SPT-1. For example, in such an embodiment, the surface of the glass may include first ions ($Na^+$), and a reinforcing agent may include second ions ($K^+$). The reinforcing agent may be provided to the glass surface, and the glass may be heated. An ion exchange phenomenon may occur depending on a heating temperature.

Depending on the heating temperature, the second ions ($K^+$) may move to the surface of the glass, and the first ions ($Na^+$) may move outside the glass. An enhancement layer may be formed on the surface of the glass as the second ions ($K^+$) are disposed on the glass. Accordingly, the surface of the glass may be tempered. As the second ions ($K^+$) are disposed on the glass, compressive stress in the surface of the glass may be increased.

The link bars LKB-1 may include a metallic material. For example, an embodiment of the link bars LKB-1 may include stainless steel. However, the metallic material of the link bars LKB-1 is not limited thereto.

An embodiment of the support plate SPT-1 may include a flat portion PLT-1, a flexible portion FLP-1, and a sub-flat portion SPLT-1. The link bars LKB-1 may be coupled to both sides of the flexible portion FLP-1 and both sides of the sub-flat portion SPLT-1. The link bars LKB-1 may be disposed in grooves GV defined on both side surfaces of the flexible portion FLP-1 and both side surfaces of the sub-flat portion SPLT-1.

An embodiment of the support part SUP-1 may include a plurality of adhesives ADL disposed between the flexible portion FLP-1 and the link bars LKB-1 and between the sub-flat portion SPLT-1 and the link bars LKB-1. The adhesives ADL may include an acrylate-based resin. In the grooves GV, the adhesives ADL may be disposed between the flexible portion FLP-1 and the link bars LKB-1 and between the sub-flat portion SPLT-1 and the link bars LKB-1. The link bars LKB-1 may be attached to the flexible portion FLP-1 and the sub-flat portion SPLT-1 by the adhesives ADL.

The adhesive forces of the adhesives ADL including the acrylate-based resin may be improved at high temperature. For example, the adhesive forces of the adhesives ADL may be improved at a temperature of 70 degrees Celsius to 80 degrees Celsius. Accordingly, in an embodiment, the link bars LKB-1 may be attached to the support plate SPT-1 by the adhesives ADL at a temperature of 70 degrees Celsius to 80 degrees Celsius.

The flexible portion FLP-1 may include first portions PT1-1 and second portions PT2-1 disposed between the first portions PT1-1. The second portions PT2-1 may be formed in a zigzag pattern like the above-described second portion PT2. The second portions PT2-1 may be formed in a zigzag pattern through a glass patterning process by a laser beam and an etchant (e.g., fluorine and/or the like).

Figure 26:
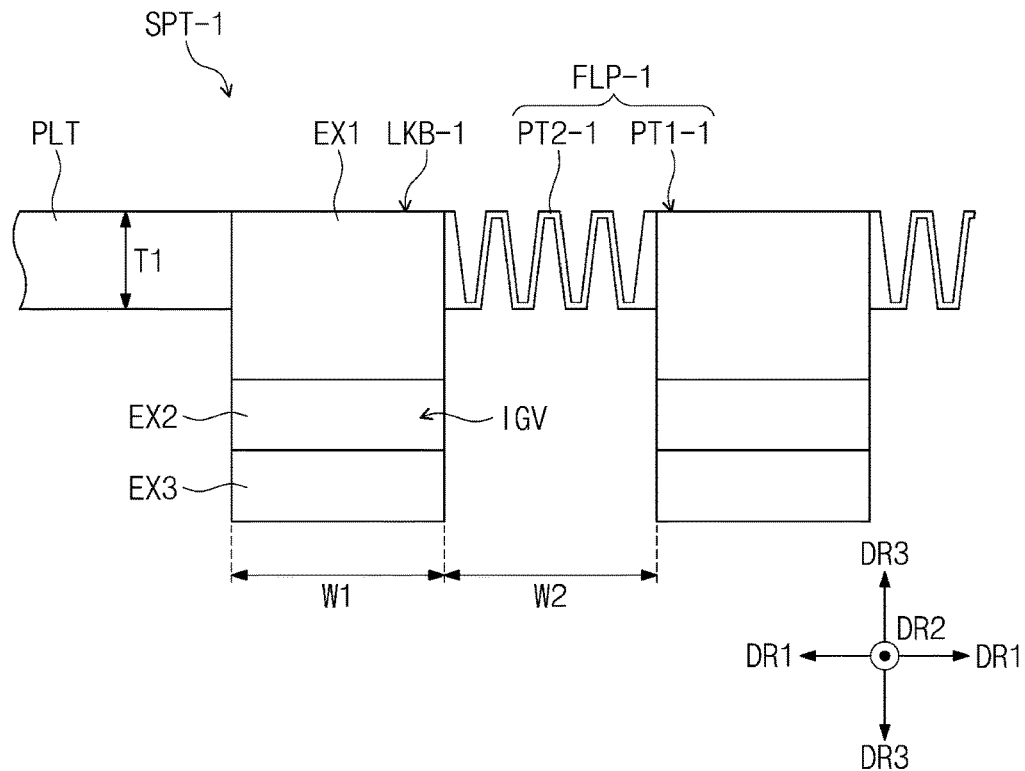
FIG. 26 is a side view of some link bars and a second portion adjacent to a flat portion of the support part illustrated in FIG. 24 as viewed in the second direction according to an embodiment.
Figure 27:
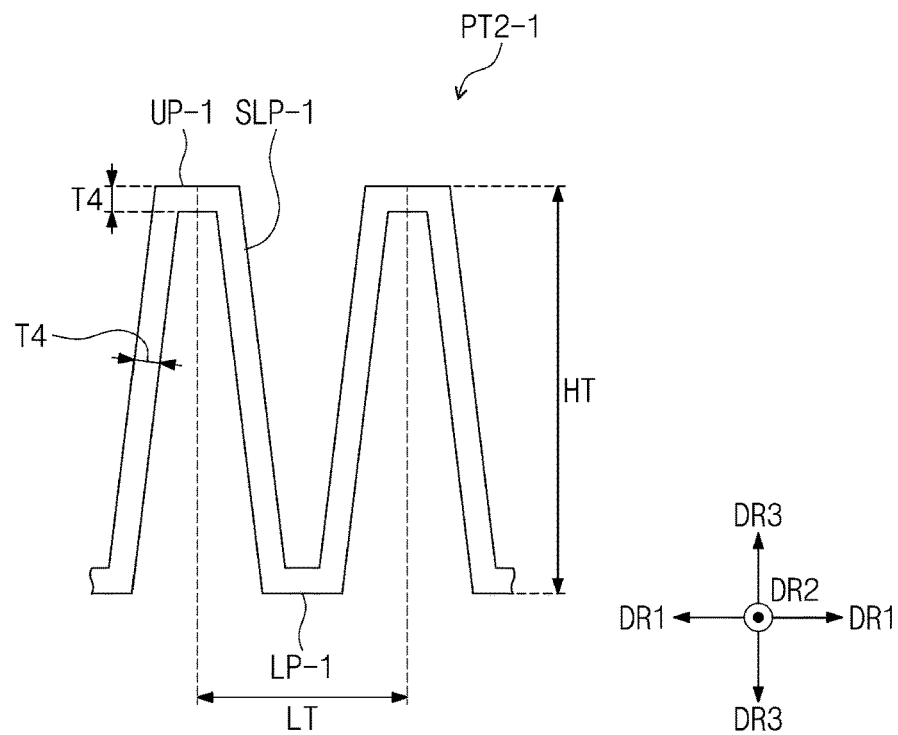
FIG. 27 is an enlarged side view of the second portion illustrated in FIG. 26.

FIG. 26 is a side view of some link bars and the second portion adjacent to the flat portion illustrated in FIG. 24 as viewed in the second direction. FIG. 27 is an enlarged view of the second portion illustrated in FIG. 26.

FIG. 26 is a side view corresponding to FIG. 12, and FIG. 27 is a side view corresponding to FIG. 13.

Referring to FIGS. 24 and 26, the second portion PT2-1 may be disposed between the link bars LKB-1. The second portion PT2-1 may extend in a zigzag pattern in the first direction DR1. As the second portion PT2-1 has the zigzag pattern, the second portion PT2-1 may have a lower elastic modulus than the flat portion PLT-1. Accordingly, the second portion PT2-1 may be more flexible than the flat portion PLT-1.

For example, an embodiment of the flat portion PLT-1 may have an elastic modulus of 150 GPa to 200 GPa and the second portion PT2-1 may have an elastic modulus of 1 MPa to 100 MPa.

The thickness T1 of the flat portion PLT-1 in the third direction DR3 may range from 200 micrometers (μm) to 500 micrometers (μm). The width W1 of each of the link bars LKB-1 in the first direction DR1 may range from 0.8 millimeters (mm) to 1.2 millimeters (mm). The width W2 of the second portion PT2-1 in the first direction DR1 may range from 0.8 millimeters (mm) to 1.2 millimeters (mm).

Referring to FIGS. 24 and 27, an embodiment of the second portion PT2-1 may include a plurality of lower end portions LP-1, a plurality of upper end portions UP-1, and a plurality of inclined portions SLP-1. The lower end portions LP-1, the upper end portions UP-1, and/or the inclined portions SLP-1 may have substantially the same configuration as the lower end portions LP, the upper end portions UP, and the inclined portions SLP of the second portion PT2 described above, and therefore descriptions thereof will be omitted.

The lower end portions LP-1, the upper end portions UP-1, and the inclined portions SLP-1 may have substantially the same thickness T4. For example, in an embodiment, the thickness T4 of each of the lower end portions LP-1, the upper end portions UP-1, and the inclined portions SLP-1 may range from 20 micrometers (μm) to 50 micrometers (μm).

The distance LT from the center of the $h^{th}$ upper end portion UP-1 to the center of the $(h+1)^{th}$ upper end portion UP-1 in the first direction DR1 may range from 100 micrometers (μm) to 250 micrometers (μm), where "h" is a natural number. The height HT of the second portion PT2-1 in the third direction DR3 may range from 200 micrometers (μm) to 500 micrometers (μm).

Figure 28:
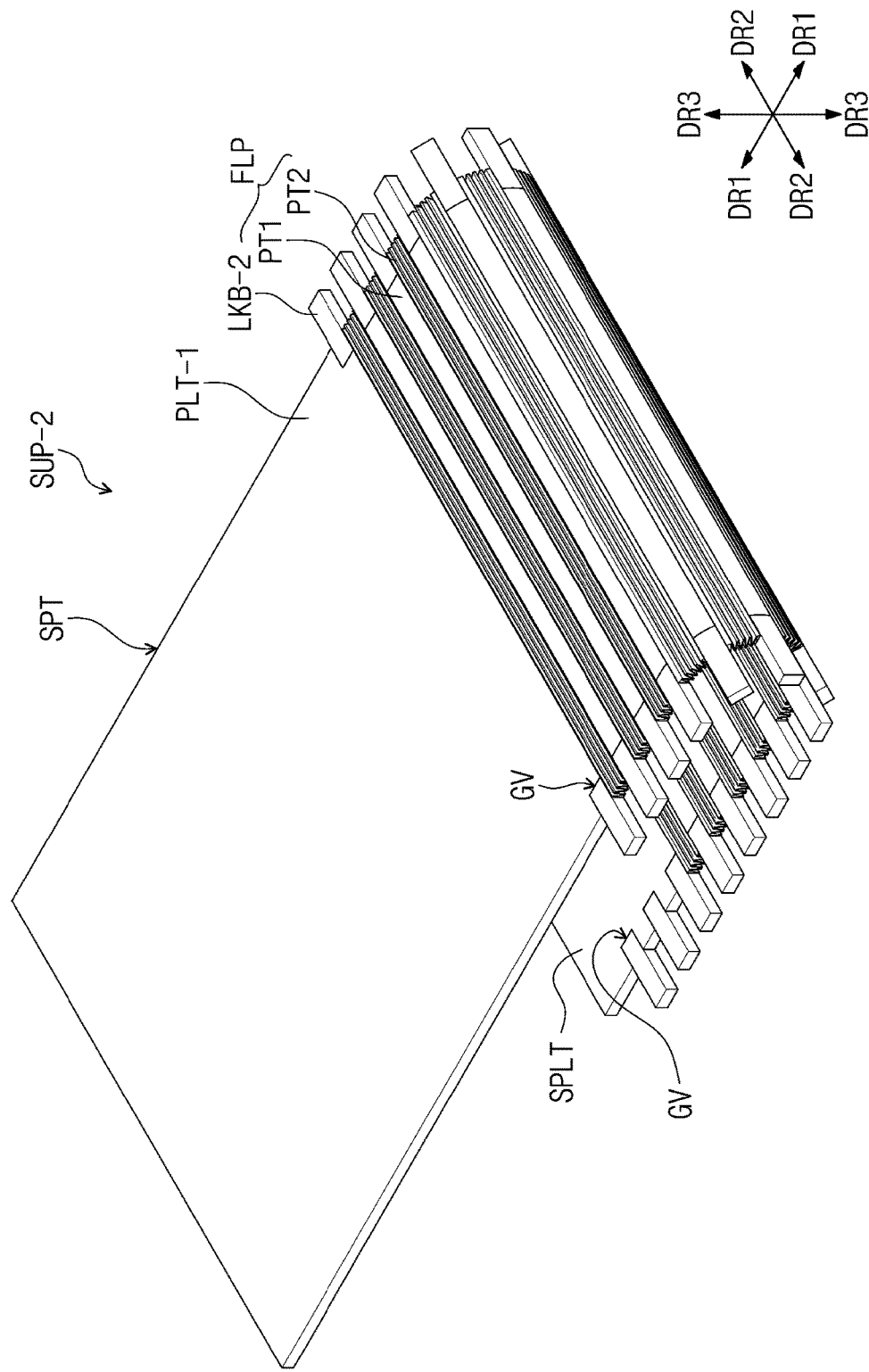
FIG. 28 is a perspective view illustrating link bars according to an embodiment of the disclosure.
Figure 29:
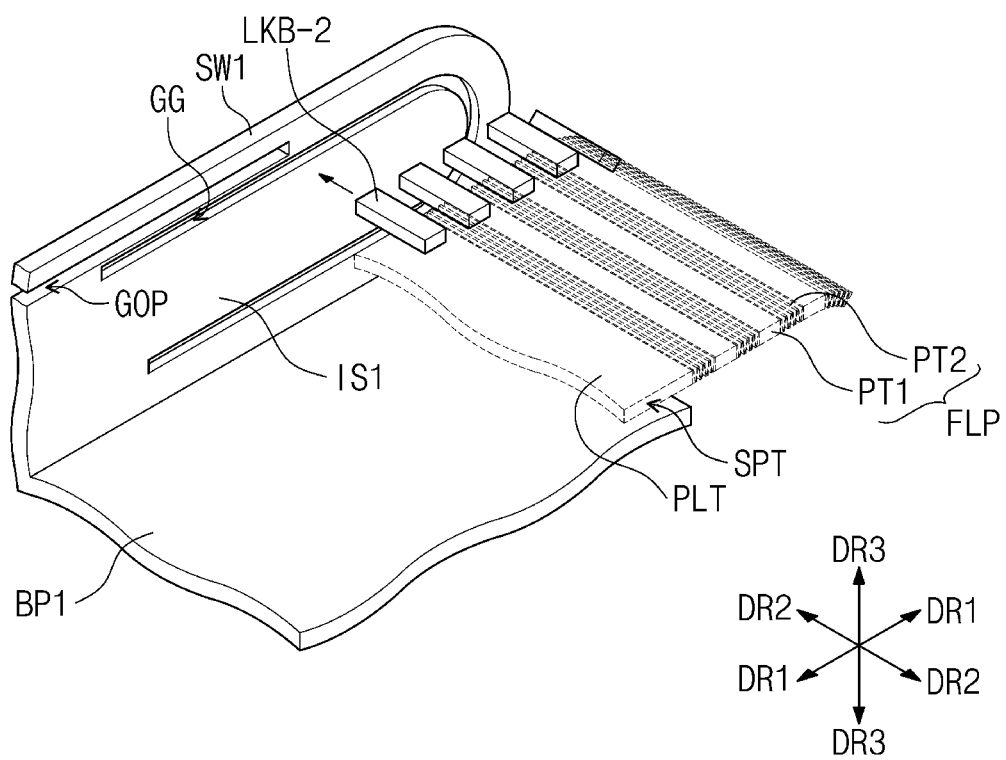
FIG. 29 is an isometric view illustrating a configuration in which the link bars illustrated in FIG. 28 are coupled to a first case according to an embodiment.

FIG. 28 is a view illustrating link bars according to an embodiment of the disclosure. FIG. 29 is a view for describing a configuration in which the link bars illustrated in FIG. 28 are coupled to a first case.

FIG. 28 is a perspective view corresponding to FIG. 14, and FIG. 29 is a perspective view corresponding to FIG. 16.

The following description will be focused on a difference between the link bars LKB illustrated in FIG. 14 and the link bars LKB-2 illustrated in FIG. 28.

Referring to FIG. 28, an embodiment of a support part SUP-2 may include the plurality of link bars LKB-2 that are disposed in grooves GV defined on both side surfaces of a flexible portion FLP and both side surfaces of a sub-flat portion SPLT and that extend in the second direction DR2. The link bars LKB-2 may have a rod shape and may extend in the second direction DR2. Unlike in the link bars LKB, the insertion grooves IGV may not be defined in the link bars LKB-2.

Referring to FIGS. 28 and 29, in an embodiment, a guide groove GG may be defined on a first inner surface IS1 of a first sidewall SW1, where the guide groove GG may have substantially the same shape as the guide rail GRA illustrated in FIG. 9. The guide groove GG may have a shape that corresponds to the first rail RA1, the second rail RA2, and the curved rail CRA of the guide rail GRA.

The link bars LKB-2 may be inserted into the guide groove GG and may be movable along the guide groove GG. As the link bars LKB-2 are disposed in the guide groove GG, a support plate SPT may be coupled to the first sidewall SW1 through the link bars LKB-2.

Figure 30:
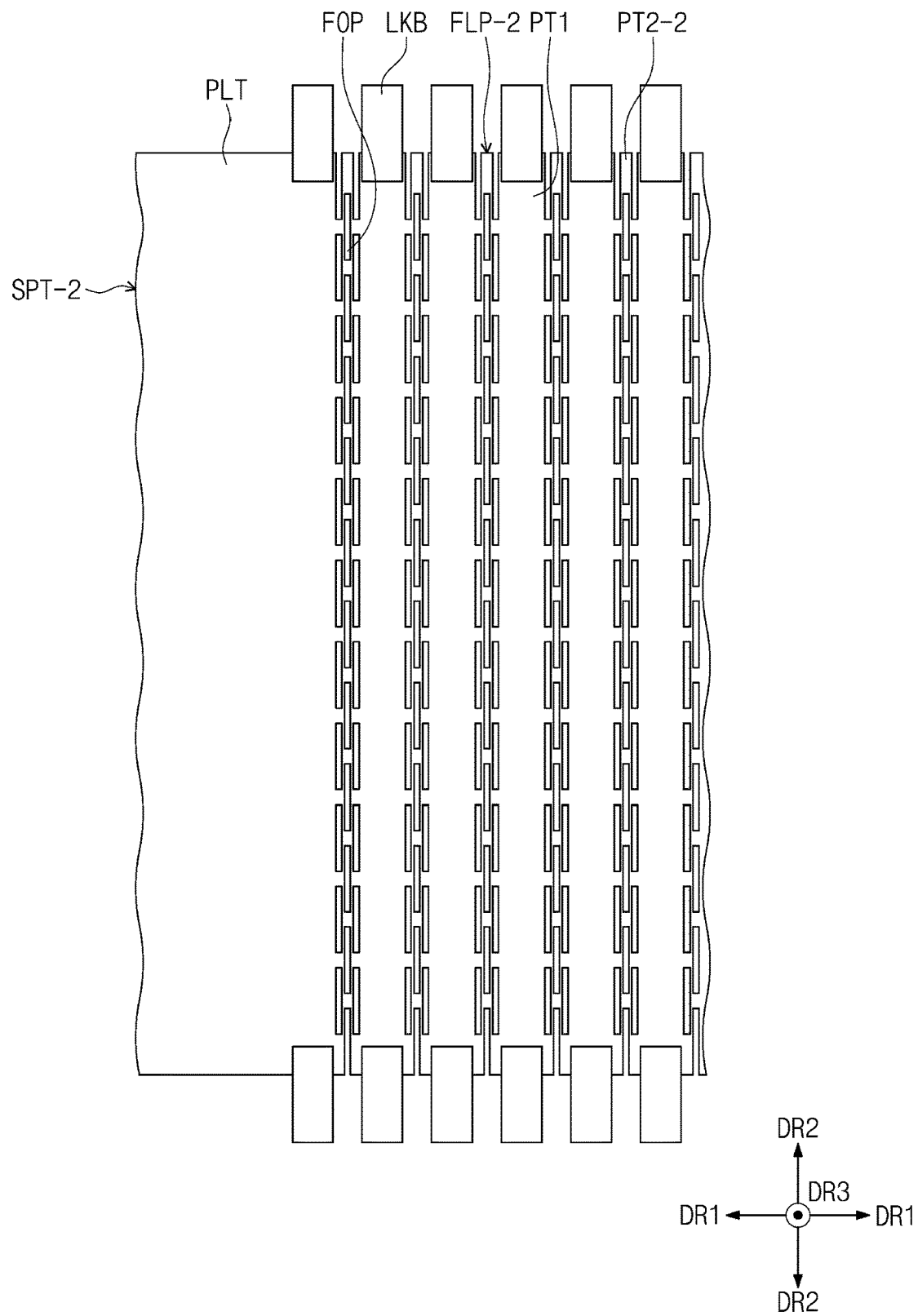
FIG. 30 is a plan view illustrating a configuration of a flexible portion according to an embodiment of the disclosure.

FIG. 30 is a view illustrating a configuration of a flexible portion according to an embodiment of the disclosure.

In FIG. 30, part of the flexible portion FLP-2 and part of a flat portion PLT are illustrated. The following description will be focused on a difference between the flexible portion FLP illustrated in FIG. 10 and the flexible portion FLP-2 illustrated in FIG. 30.

Referring to FIG. 30, an embodiment of a support plate SPT-2 may include the flat portion PLT and the flexible portion FLP-2 extending from the flat portion PLT in the first direction DR1. The flexible portion FLP-2 may have a lower elastic modulus than the flat portion PLT.

A plurality of openings FOP may be defined in second portions PT2-2 of the flexible portion FLP-2 such that the flexible portion FLP-2 may have a lower elastic modulus than the flat portion PLT. The openings FOP may not be defined in first portions PT1. The openings FOP may be arranged in a grid form. Since the openings FOP may be defined in the second portions PT2-2, the flexible portion FLP-2 may be more flexible than the flat portion PLT.

Figure 31:
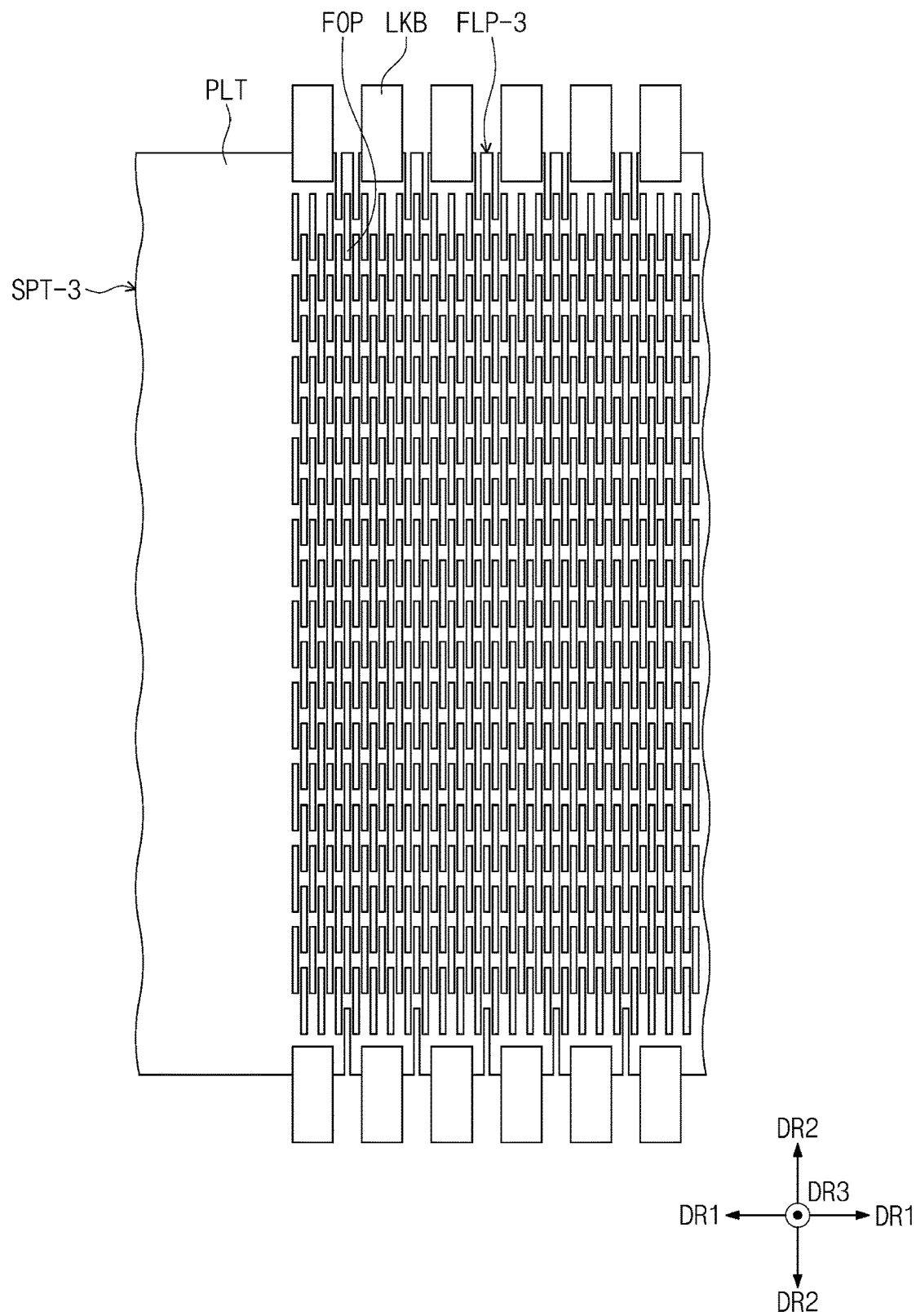
FIG. 31 is a plan view illustrating a configuration of a flexible portion according to an embodiment of the disclosure.

FIG. 31 is a view illustrating a configuration of a flexible portion according to an embodiment of the disclosure.

FIG. 31 is a plan view corresponding to FIG. 30. The following description will be focused on a difference between the flexible portion FLP-2 illustrated in FIG. 30 and the flexible portion FLP-3 illustrated in FIG. 31.

Referring to FIG. 31, an embodiment of a plurality of openings FOP may be defined in the flexible portion FLP-3 such that the flexible portion FLP-3 of a support plate SPT-3 may have a lower elastic modulus than a flat portion PLT. Substantially, the openings FOP may be additionally defined in the first portions PT1 illustrated in FIG. 30 to form the flexible portion FLP-3 illustrated in FIG. 31. As the openings FOP may be defined in the flexible portion FLP-3, the flexible portion FLP-3 may be more flexible than the flat portion PLT.

FIGS. 32 to 35 are views illustrating the shapes of second portions according to various embodiments of the disclosure.

FIGS. 32 to 35 are side views corresponding to FIG. 12. The following descriptions will be focused on differences between the second portions PT2 illustrated in FIG. 12 and the second portions PT2-3 to PT2-6 illustrated in FIGS. 32 to 35. Furthermore, components other than the second portions PT2-3 to PT2-6 in FIGS. 32 to 35 may be the same as the above-described components illustrated in FIG. 12. Therefore, descriptions thereof will be omitted, and the same components will be assigned with the same reference numerals.

Figure 32:
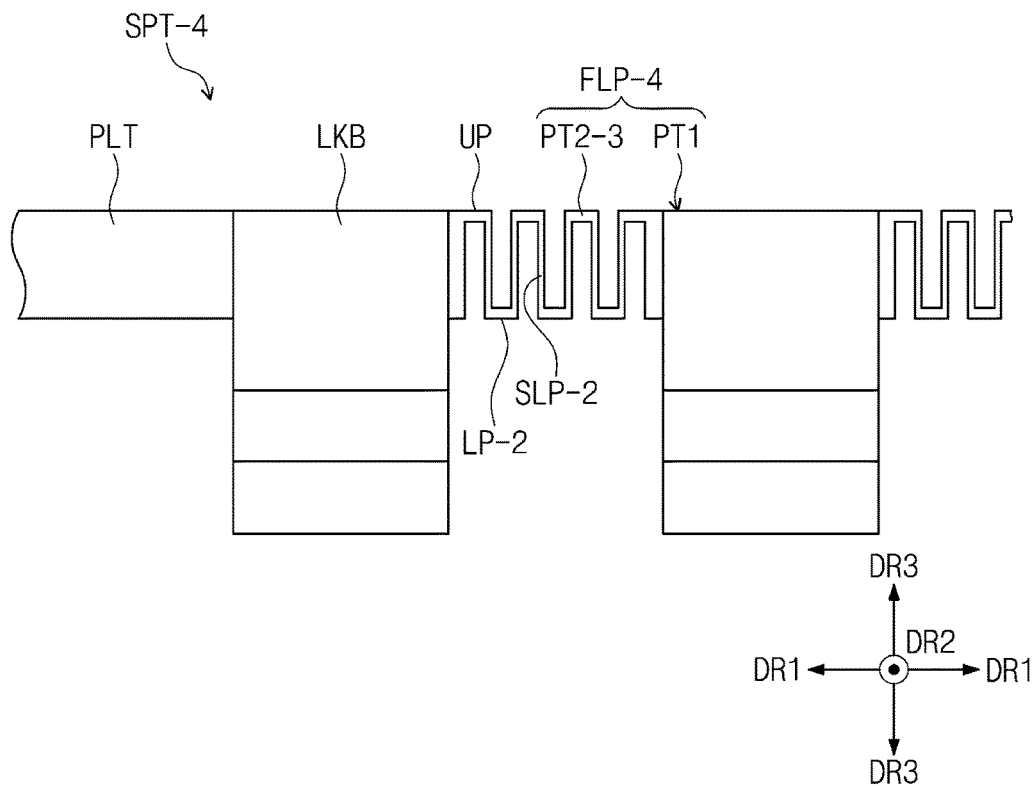
FIG. 32 is a side view illustrating a shape of a second portion according to an embodiment of the disclosure.

Referring to FIG. 32, an embodiment of the second portions PT2-3 of a flexible portion FLP-4 may extend in a vertically bent zigzag shape. In an embodiment, for example, inclined portions SLP-2 may extend in the third direction DR3 from upper end portions UP-2 toward lower end portions LP-2. The upper end portions UP-2 and the inclined portions SLP-2 may vertically form a right angle, and the lower end portions LP-2 and the inclined portions SLP-2 may vertically form a right angle.

Figure 33:
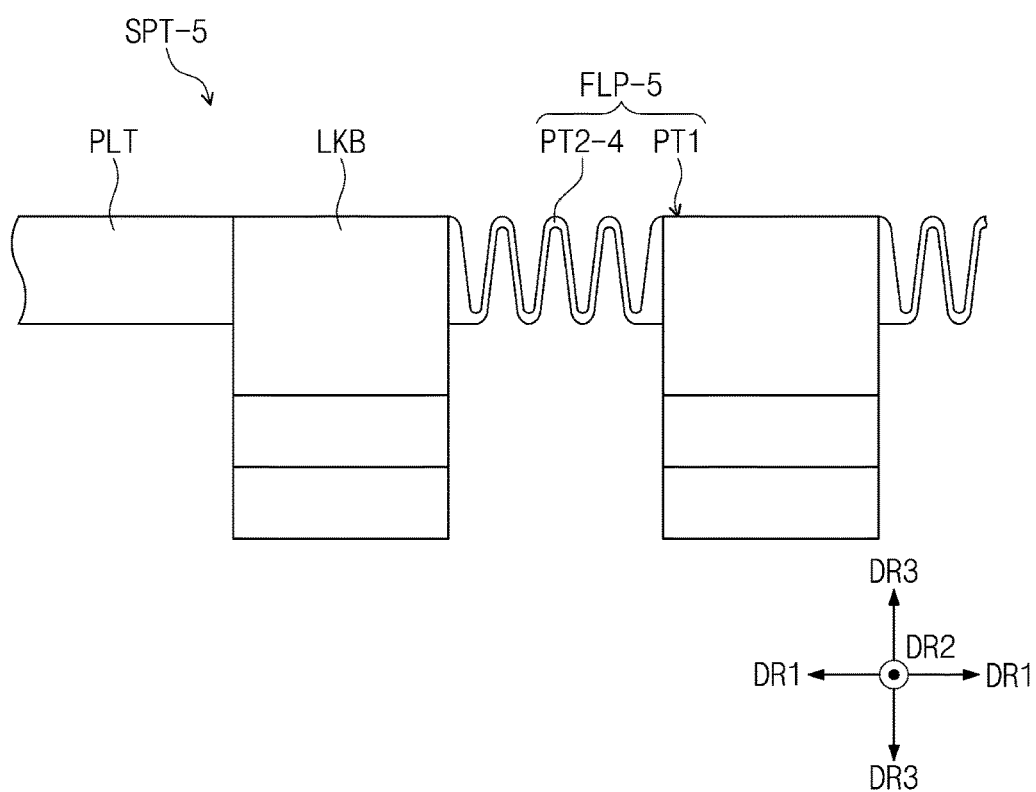
FIG. 33 is a side view illustrating a shape of a second portion according to an embodiment of the disclosure.

Referring to FIG. 33, an embodiment of the second portions PT2-4 of a flexible portion FLP-5 may extend in a curved shape, for example, a wavy shape.

Figure 34:
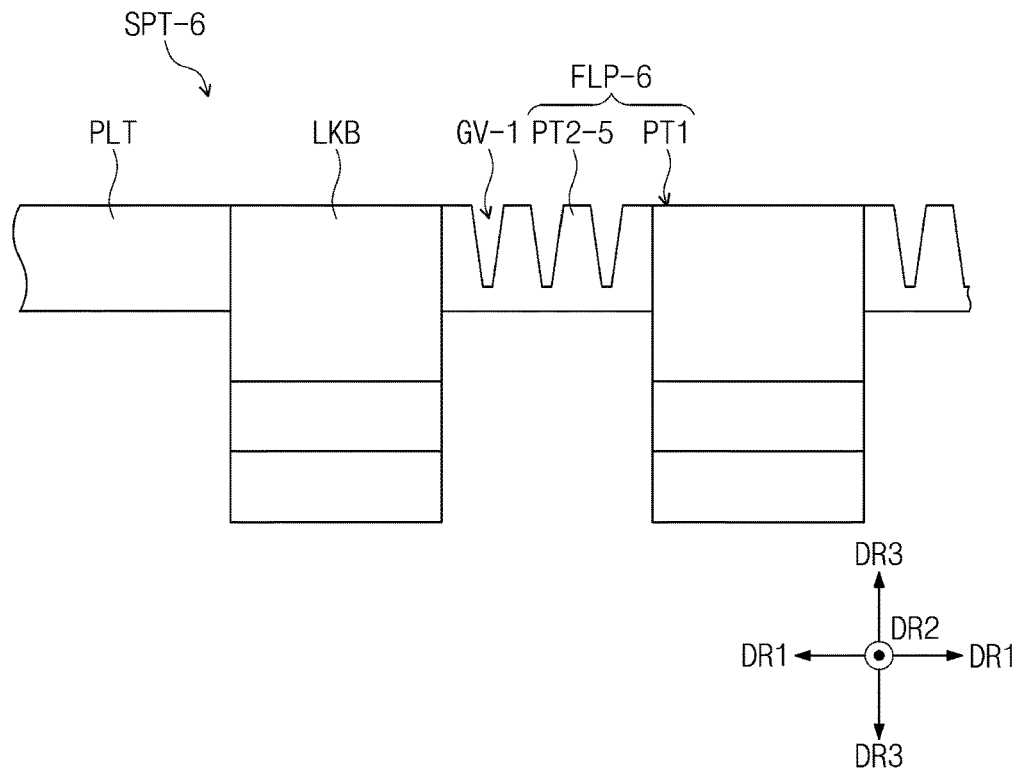
FIG. 34 is a side view illustrating a shape of a second portion according to an embodiment of the disclosure.

Referring to FIG. 34, an embodiment of a plurality of grooves GV-1 may be defined on upper surfaces of the second portions PT2-5 of a flexible portion FLP-6. The grooves GV-1 may be defined by being depressed downward from portions of the upper surfaces of the second portions PT2-5.

Figure 35:
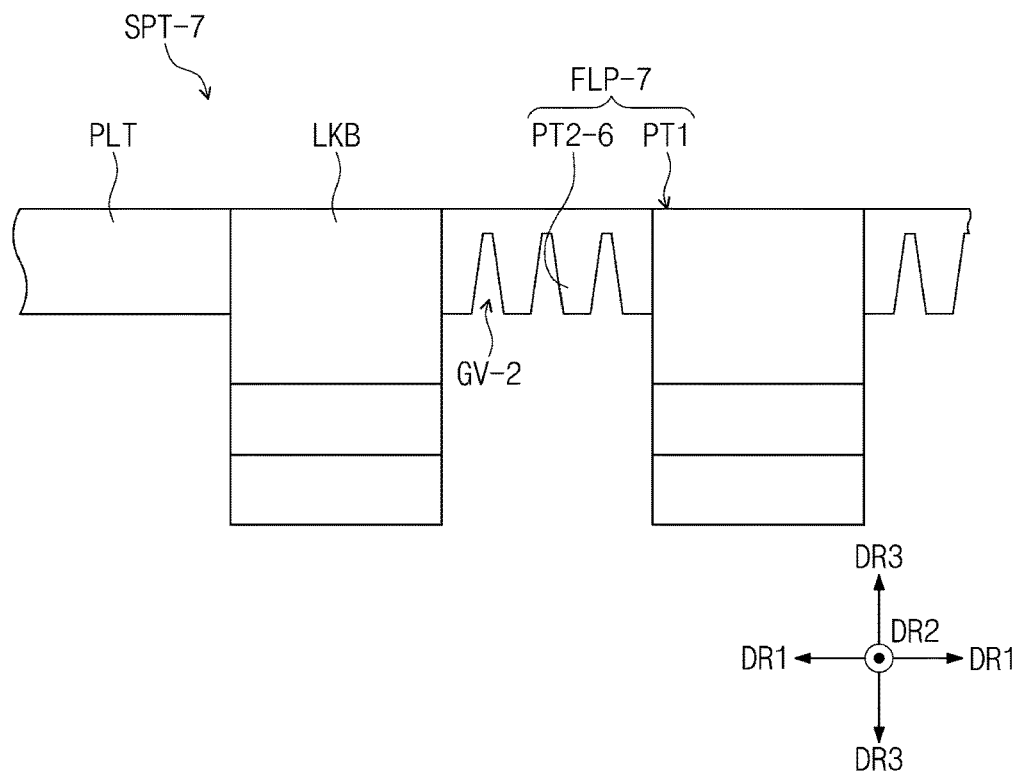
FIG. 35 is a side view illustrating a shape of a second portion according to an embodiment of the disclosure.

Referring to FIG. 35, an embodiment of a plurality of grooves GV-2 may be defined on lower surfaces of the second portions PT2-6 of a flexible portion FLP-7. The grooves GV-2 may be defined by being depressed upward from portions of the lower surfaces of the second portions PT2-6.

According to embodiments of the disclosure, the support plate including the flat portion having a high elastic modulus and the flexible portion having a low elastic modulus may support the display module, and the flexible portion may be more easily folded together with the display module and may be accommodated in the case.

In an embodiment, the link bars disposed on both side surfaces of the flexible portion may be coupled to the guide rails of the case and may move along the guide rails, and thus configuring the display module between the default mode and the extended mode may be easily performed. The support plate and the link bars may include a plastic material, and thus the display device may be made light in weight.

The invention should not be construed as being limited to the embodiments set forth herein. Rather, these embodiments are provided so that this disclosure will be thorough and complete and will fully convey the concept of the invention to those skilled in the art.

While the invention has been shown and described with reference to embodiments thereof, it will be understood to those of ordinary skill in the art that various changes and modifications in form and details may be made thereto without departing from the spirit and scope of the present disclosure as defined by the following claims.

What is claimed is:

1. A display device comprising:
a display module;
a support plate disposed on a rear surface of the display module, the support plate includes a flat portion and a flexible portion configured to extend from the flat portion and foldable such that a portion of the flexible portion is disposed under the flat portion, wherein the flexible portion is foldable about a folding axis extending in one direction; and
a plurality of link bars disposed on both side surfaces of the flexible portion opposite to each other in the one direction, the plurality of link bars being configured to protrude in the one direction,
wherein at least one groove is defined by a portion of an upper surface of the flexible portion being recessed downward, and the at least one groove is provided as an empty space and extends in a second direction perpendicular to the one direction.

2. The display device of claim 1, wherein the flexible portion has a lower elastic modulus than the flat portion.

3. The display device of claim 1, wherein the flexible portion includes:
a plurality of first portions configured to overlap the plurality of link bars when viewed in the one direction; and
a plurality of second portions disposed between the plurality of link bars when viewed in the one direction, the plurality of second portions having a lower elastic modulus than the first portions.

4. The display device of claim 3, wherein the plurality of second portions includes a lower elastic modulus than the flat portion.

5. The display device of claim 4, wherein the flat portion has an elastic modulus of 6 GPa to 12 GPa, and the plurality of second portions have an elastic modulus of 1 MPa to 100 MPa.

6. The display device of claim 4, wherein the flat portion has an elastic modulus of 150 GPa to 200 GPa, and the plurality of second portions have an elastic modulus of 1 MPa to 100 MPa.

7. The display device of claim 3, wherein the plurality of second portions extend in a zigzag pattern in the one direction.

8. The display device of claim 7, wherein each of the plurality of second portions includes:
a plurality of lower end portions arranged in the one direction;
a plurality of upper end portions disposed above the plurality of lower end portions and arranged in the one direction, the plurality of upper end portions being disposed between the plurality of lower end portions when viewed on a plane; and
a plurality of inclined portions configured to form an obtuse angle with the plurality of upper end portions and the plurality of lower end portions and to extend from the plurality of upper end portions toward the plurality of lower end portions.

9. The display device of claim 1, wherein the support plate includes a support plate plastic material, and the plurality of link bars include a link bar plastic material, wherein the link bar plastic material is different from the support plate plastic material, and
wherein the support plate and the plurality of link bars are bonded to each other by double injection molding.

10. The display device of claim 1, further comprising:
an adhesive disposed between the plurality of link bars and the flexible portion,
wherein the support plate includes glass, and
wherein the plurality of link bars include a metallic material.

11. The display device of claim 1, wherein the plurality of link bars are disposed in a plurality of grooves defined on the both side surfaces of the flexible portion and protrude outward from the both side surfaces of the flexible portion.

12. The display device of claim 1, further comprising:
a first case; and
a second case coupled to the first case in a first direction,
wherein the one direction is defined as a second direction crossing the first direction, and
wherein the first case is movable toward or away from the second case in the first direction and configured to accommodate the display module and the support plate together with the second case.

13. The display device of claim 12, further comprising:
guide rails disposed on inner surfaces of the first case, wherein the guide rails are configured to face each other in the second direction, and
wherein the plurality of link bars are coupled to the guide rails to be movable along the guide rails.

14. The display device of claim 13, wherein each of the guide rails includes:
a first rail configured to extend in the first direction;
a second rail configured to extend in the first direction and disposed under the first rail; and
a curved rail configured to extend from one side of the first rail to one side of the second rail, the curved rail having a curved shape.

15. The display device of claim 13, wherein each of the plurality of link bars includes:
a first extension configured to extend in the second direction;
a second extension configured to extend downward from a portion of the first extension; and a third extension configured to extend from a lower end of the second extension in the second direction to face the first extension,
wherein the link bars defines grooves between the first extension, the second extension and the third extension, and
wherein the guide rails are disposed within the insertion grooves.

16. The display device of claim 13, wherein the first case includes:
a first bottom part;
first sidewalls configured to extend upward from both sides of the first bottom part to be opposite to each other in the second direction;
first covers disposed on the first sidewalls and configured to overlap the plurality of link bars;
a rear part having a convex shape directed outwardly, wherein the rear part is connected to one side of the first bottom part opposite to each other in the first direction and connected to sides of the first sidewalls adjacent to the one side of the first bottom part; and
protrusions located on outer surfaces of the first sidewalls to extend in the first direction,
wherein first inner surfaces of the first sidewalls are configured to face each other in the second direction to define the inner surfaces of the first case.

17. The display device of claim 16, wherein the second case includes:
a second bottom part disposed under the first bottom part;
a front part configured to face the rear part;
second sidewalls configured to extend upward from both sides of the second bottom part opposite to each other in the second direction, the second sidewalls being disposed on the outer surfaces of the first sidewalls; and
second covers disposed on the second sidewalls and the first covers and configured to overlap the plurality of link bars;
wherein grooves are defined on second inner surfaces of the second sidewalls to face each other in the second direction and to extend in the first direction, and
wherein the protrusions are disposed in the grooves to be movable in the first direction.

18. The display device of claim 17, further comprising:
sub-support parts connected to second inner surfaces of the second sidewalls configured to face each other in the second direction, wherein the sub-support parts are movable in the first direction along guide openings defined in the first sidewalls and configured to extend in the first direction,
wherein the sub-support parts are disposed under the flat portion.

19. The display device of claim 12, wherein guide grooves are defined in inner surfaces of the first case configured to face each other in the second direction, and
wherein the plurality of link bars are inserted into the guide grooves and movable along the guide grooves.

20. The display device of claim 1, wherein a plurality of openings are defined in the flexible portion.

21. A display device comprising:
a display module; and
a support plate disposed on a rear surface of the display module, the support plate including a flat portion and a flexible portion, wherein the flexible portion is configured to extend from the flat portion such that a portion of the flexible portion is disposed under the flat portion, the flexible portion having a lower elastic modulus than the flat portion,
wherein the flexible portion is foldable about a folding axis extending in one direction,
wherein the flexible portion includes:
a plurality of first portions; and
a plurality of second portions, wherein the plurality of second portions are disposed between the plurality of first portions to extend in a zigzag pattern in a first direction crossing the one direction, and
wherein at least one first groove is defined by a portion of an upper surface of the flexible portion being recessed downward, and at least one second groove is defined by a portion of a lower surface of the flexible portion being recessed upward and adjacent to the at least one first groove.

22. A display device comprising:
a display module;
a support plate disposed on a rear surface of the display module and configured to extend in a first direction, wherein the support plate includes a first side surface opposite a second side surface in a second direction that crosses the first direction
a plurality of link bars disposed on the first side surface and the second side surface;
a case having inner surfaces facing each other in the second direction and accommodating the display module and the support plate; and
guide rails disposed on the inner surfaces and in insertion grooves which are defined at ends of the plurality of link bars.

23. An electronic device comprising:
a display device for providing an image,
wherein the display device comprises:
a display module; and
a support plate disposed on a rear surface of the display module, the support plate including a flat portion and a flexible portion, wherein the flexible portion is configured to extend from the flat portion such that a portion of the flexible portion is disposed under the flat portion, the flexible portion having a lower elastic modulus than the flat portion,
wherein the flexible portion is foldable about a folding axis extending in one direction,
wherein the flexible portion includes:
a plurality of first portions; and
a plurality of second portions, wherein the plurality of second portions are disposed between the plurality of first portions to extend in a zigzag pattern in a first direction crossing the one direction, and
wherein at least one first groove is defined by a portion of an upper surface of the flexible portion being recessed downward, and at least one second groove is defined by a portion of a lower surface of the flexible portion being recessed upward and adjacent to the at least one first groove.

* * * * *